(12) United States Patent
Barney

(10) Patent No.: US 9,075,849 B2
(45) Date of Patent: *Jul. 7, 2015

(54) METHOD AND SYSTEM FOR PROBABILISTICALLY QUANTIFYING AND VISUALIZING RELEVANCE BETWEEN TWO OR MORE CITATIONALLY OR CONTEXTUALLY RELATED DATA OBJECTS

(71) Applicant: PatentRatings, LLC, Irvine, CA (US)

(72) Inventor: Jonathan A. Barney, Newport Beach, CA (US)

(73) Assignee: PATENTRATINGS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,208

(22) Filed: Jul. 22, 2014

(65) Prior Publication Data

US 2015/0046420 A1    Feb. 12, 2015

Related U.S. Application Data

(60) Continuation of application No. 13/958,386, filed on Aug. 2, 2013, now Pat. No. 8,818,996, which is a continuation of application No. 13/411,441, filed on Mar. 2, 2012, now Pat. No. 8,504,560, which is a (Continued)

(51) Int. Cl.
*G06F 17/30* (2006.01)

(52) U.S. Cl.
CPC ...... *G06F 17/3053* (2013.01); *G06F 17/30675* (2013.01); *G06F 17/30716* (2013.01);

(Continued)

(58) Field of Classification Search
CPC ............... G06F 17/30728; G06F 17/30861; G06F 17/30011; G06F 17/30014; G06F 17/30722; G06F 17/3053; G06F 17/30675; G06F 17/30716; G06F 17/30864

USPC ........ 707/705, 722, 726, 728, 731, 923, 930, 707/933, 937, 999.1

See application file for complete search history.

(56) References Cited

U.S. PATENT DOCUMENTS

| 5,175,681 A | 12/1992 | Iwai et al. |
| 5,576,954 A | 11/1996 | Driscoll |

(Continued)

FOREIGN PATENT DOCUMENTS

| EP | 1 215599 | 6/2002 |
| WO | WO 00/75851 | 12/2000 |
| WO | WO 01/35277 | 5/2001 |

OTHER PUBLICATIONS

"Bond Rating," Printout from unknown website. 1997.

(Continued)

*Primary Examiner* — Hares Jami
(74) *Attorney, Agent, or Firm* — Knobbe, Martens, Olson & Bear, LLP

(57) ABSTRACT

In one embodiment a method for probabilistically quantifying a degree of relevance between two or more citationally or contextually related data objects, such as patent documents, non-patent documents, web pages, personal and corporate contacts information, product information, consumer or behavior, technical or scientific information, address information, and the like is provided. In another embodiment a method for visualizing and displaying relevance between two or more citationally or contextually related data objects is provided. In another embodiment a search input/output interface that utilizes an iterative self-organizing mapping technique to automatically generate a visual map of relevant patents and/or other related documents desired to be explored, searched or analyzed is provided. In another embodiment, a search input/output interface that displays and/or communicates search input criteria and corresponding search results in a way that facilitates intuitive understanding and visualization of the logical relationships between two or more related concepts being searched is provided.

20 Claims, 12 Drawing Sheets

Related U.S. Application Data division of application No. 12/749,381, filed on Mar. 29, 2010, now Pat. No. 8,131,701, which is a division of application No. 11/236,965, filed on Sep. 27, 2005, now Pat. No. 7,716,226.

(52) U.S. Cl.
CPC ...... *G06F17/30864* (2013.01); *G06F 2216/11* (2013.01); *Y10S 707/933* (2013.01); *Y10S 707/912* (2013.01); *Y10S 707/923* (2013.01); *Y10S 707/93* (2013.01); *Y10S 707/937* (2013.01); *G06F 17/30572* (2013.01); *G06F 17/30728* (2013.01); *G06F 17/30861* (2013.01); *G06F 17/301* (2013.01); *G06F 17/30321* (2013.01); *G06F 17/30554* (2013.01)

(56) References Cited

U.S. PATENT DOCUMENTS

| | | | |
|---|---|---|---|
| 5,594,897 A * | 1/1997 | Goffman | 1/1 |
| 5,608,620 A | 3/1997 | Lundgren | |
| 5,680,305 A | 10/1997 | Apgar, IV | |
| 5,694,592 A | 12/1997 | Driscoll | |
| 5,721,910 A | 2/1998 | Unger | |
| 5,754,840 A | 5/1998 | Rivette et al. | |
| 5,774,833 A | 6/1998 | Newman | |
| 5,799,325 A | 8/1998 | Rivette et al. | |
| 5,832,494 A | 11/1998 | Egger et al. | |
| 5,848,409 A | 12/1998 | Ahn | |
| 5,991,751 A | 11/1999 | Rivette et al. | |
| 5,999,907 A | 12/1999 | Donner | |
| 6,018,714 A | 1/2000 | Risen, Jr. et al. | |
| 6,018,749 A | 1/2000 | Rivette et al. | |
| 6,038,561 A | 3/2000 | Snyder et al. | |
| 6,154,725 A | 11/2000 | Donner | |
| 6,175,824 B1 | 1/2001 | Breitzman et al. | |
| 6,202,058 B1 | 3/2001 | Rose et al. | |
| 6,263,314 B1 | 7/2001 | Donner | |
| 6,286,018 B1 * | 9/2001 | Pitkow et al. | 715/206 |
| 6,330,547 B1 | 12/2001 | Martin | |
| 6,389,418 B1 | 5/2002 | Boyack et al. | |
| 6,499,026 B1 * | 12/2002 | ***Smith et al. | 1/1 |
| 6,526,440 B1 | 2/2003 | Bharat | |
| 6,556,992 B1 | 4/2003 | Barney et al. | |
| 6,604,114 B1 | 8/2003 | Toong et al. | |
| 6,754,873 B1 | 6/2004 | Law et al. | |
| 6,799,176 B1 * | 9/2004 | Page | 1/1 |
| 6,832,211 B1 | 12/2004 | Thomas et al. | |
| 7,188,069 B2 | 3/2007 | Hagelin | |
| 7,213,198 B1 | 5/2007 | Harik | |
| 7,292,994 B2 | 11/2007 | Prokoski | |
| 7,451,388 B1 | 11/2008 | Henzinger et al. | |
| 7,912,842 B1 | 3/2011 | Bayliss | |
| 7,962,511 B2 | 6/2011 | Barney | |
| 2002/0002524 A1 | 1/2002 | Kossovsky et al. | |
| 2002/0004775 A1 | 1/2002 | Kossovsky et al. | |
| 2002/0022974 A1 | 2/2002 | Lindh | |
| 2002/0035499 A1 | 3/2002 | Germeraad et al. | |
| 2002/0046038 A1 | 4/2002 | Prokoski | |
| 2002/0077835 A1 | 6/2002 | Hagelin | |
| 2002/0082778 A1 | 6/2002 | Barnett et al. | |
| 2002/0087442 A1 | 7/2002 | Reader | |
| 2002/0099638 A1 | 7/2002 | Coffman et al. | |
| 2002/0156760 A1 | 10/2002 | Lawrence et al. | |
| 2003/0036945 A1 | 2/2003 | Del Vecchio et al. | |
| 2003/0065658 A1 | 4/2003 | Matsubayashi et al. | |
| 2003/0074350 A1 * | 4/2003 | Tsuda | 707/3 |
| 2003/0212572 A1 | 11/2003 | Poltorak | |
| 2004/0010393 A1 | 1/2004 | Barney | |
| 2004/0068453 A1 | 4/2004 | Duan et al. | |
| 2004/0103112 A1 | 5/2004 | Colson et al. | |
| 2004/0122841 A1 | 6/2004 | Goodman et al. | |
| 2004/0133433 A1 | 7/2004 | Lee et al. | |
| 2005/0021434 A1 | 1/2005 | D'Loren | |
| 2005/0071174 A1 | 3/2005 | Leibowitz et al. | |
| 2005/0071743 A1 * | 3/2005 | Harrington et al. | 715/500 |
| 2005/0149420 A1 | 7/2005 | Hagelin et al. | |
| 2006/0036452 A1 | 2/2006 | Williams | |
| 2006/0036453 A1 | 2/2006 | Williams | |
| 2006/0036529 A1 | 2/2006 | Williams | |
| 2006/0036632 A1 | 2/2006 | Williams | |
| 2006/0036635 A1 | 2/2006 | Williams | |
| 2006/0074867 A1 * | 4/2006 | Breitzman | 707/3 |
| 2006/0224999 A1 | 10/2006 | Albrecht et al. | |
| 2007/0073625 A1 | 3/2007 | Shelton | |
| 2007/0073748 A1 | 3/2007 | Barney | |
| 2007/0088738 A1 | 4/2007 | Barney et al. | |
| 2007/0094297 A1 | 4/2007 | Barney | |
| 2007/0150298 A1 | 6/2007 | Barney | |
| 2007/0208669 A1 | 9/2007 | Rivette et al. | |
| 2008/0091620 A1 | 4/2008 | Vollenweider et al. | |

OTHER PUBLICATIONS

"Calculation of Indicated Market Value" TRRU IP Valuation Report Dec. 14, 2000.

"Empirical Evidence of Patent Validity," AIPLA Quarterly Journal, vol. 28: 185. pp. 187-275. 1998.

"Intellectual Property," Website: www.edtn.com. Feb. 15, 1999.

"Patent Cafe Website of Satisfy the Inventor's Heartiest Appetite," Desert Maller News. Sep. 21, 1999.

"Patent Claim Analysis." Site Hawk Date Unknown.

"The Open Platform for Intellectual Property Asset Management" AURGIN products pamphlet for Aureka 7.0 software. 1999.

"Value Relevance of Nonfinancial Information: The Case of Patent Data." Nov. 2001.

AIPLA., "Report of Economic Survey" (1991).

Albert, M.B., D. Avery, F. Narin and P. McAllister "Direct Validation of Citation Counts as Indicators of Industrially Important Patents", Research Policy, vol. 20, 1991, pp. 251-259.

Allison, J.R., M.A. Lemley, K.A. Moore and R.D. Trunkey "Valuable Patents", Boalt Working Papers in Public law, Paper 28, 2003.

American Intellectual Property Law Association, Report of Economic Survey, pp. 63-63 (1999).

Aurigin Systems, Inc. Aureka Cite Module 1998.

Barney.U.A, "A Study Patent Mortality Rates: USing Statistical Survival Analysis to Rate and Value Patent Assets", AIPLA Quarterly Journal, vol. 30, No. 3, pp. 317-352.

Barron, Russell J. "Better Accounting for Patent Portfolios" Legal Times. Oct. 16, 2000. pp. 91-92.

Bramson, Robert S. "Valuing Patents, Technologies and Portfolios: Rules of Thumb." Website: www.ventius.com May 1, 2000.

Buchanan, J.M. "Patent Rankings: The Numbers Game v. Patent Quality", blog post, downloaded from www.rethinkip.com, Apr. 20, 2005.

Cockburn, Iain, et al., "Industry Effects and Appropriability Measures in the Stock Market's Valuation of R&D and Patents," National Bureau of Economic Research. Cambridge, MA. Dec. 1987.

Freewing Aerial Robotics Corporation Determination of Fair Market Value Jun. 1, 1997.

Grilliches, Zvi. "Patent Statistics as Economic Indicators: A Survey Part I." National Bureau of Economic Research. Cambridge, MA. Mar. 1990.

Hall, Bronwyn H "Market Value and Patent Citations: A First Look" May 2001.

Hall, Bronwyn H. "Innovation and Market Value." National Bureau of Economic Research, Cambridge, MA. Feb. 1999.

Harhoff, D., F. Narin, F.M. Scherer and K. Vopel "Citation Frequency and the Value of Patented Innovation", Discussion paper 97-27, Aug. 1997.

Heiden, Bowman J., "The Microeconomic Asset Value of a Patent: An Empiracle Study of Highly valuable Swedish-owned Patents," Center for Intellectual Property Studies Dept. of Industrial Management & Economics, Chalmers University of Technology (Apr. 2001).

Jaffe, Adam B., et al., "International Knowledge Flows: Evidence from Patent Citations." National Bureau of Economic Research. Cambridge, MA. Apr. 1998.

(56) References Cited

OTHER PUBLICATIONS

Khan, B. Zorina. "Legal Monopoly: Patents and Antitrust Litigation in U.S. Manufacturing, 1970-1998." National Bureau of Economic Research Cambridge, MA Apr. 1999.

Kim, Ad., N.W. Partee, T.J. Reynolds and M.A. Santamaria "Patent Litigation Risk-Scoring Model", Proceedings of the 2002 IEEE Systems and Information Design Symposium, 2002, pp. 13-17.

Kohonen, T., S. Kaski, K. Lagus, J. Salojarvi, J. Honkela, V. Paatero and A Saarela "Self Organization of a Massive Document Collection", IEEE Transactions of Neural Networks, vol. 11, No. 3, May 2000, pp. 574-585.

Lanjouw, J.O. and M. Schankerman "Characteristics of Patent Litigation: A Window on Competition", RAND Journal of Economics, vol. 32, No. 1, Spring 2001, pp. 129-151.

Lanjouw, Jean O., et al. "How to Count Patents and Value Intellectual Property: Uses of Patent Renewal and Application Data." National Bureau of Economic Research. Cambridge, MA. Jul. 1996.

Lanjouw, Jean O., et al. "Stylized Facts of Patent Ligation." National Bureau of Economic Research. Cambridge, MA. Oct. 1999.

Lanjouw, Jean O., et al. "Stylized Facts of Patent Litigation: Value, Scope and Ownership." National Bureau of Economic Research. Cambridge, MA. Mar. 1990.

Lanjouw, Jean O., et al. "The Enforcement of Intellectual Property Rights: A survey of the Empirical Literature." National Bureau of Economic Research. Cambridge, MA. Dec. 1997.

Los Angeles Times, "Marketplace of Ideas: Selling Patents Online." Oct. 25, 1999, Section C.

Malki, Elli "Intellectual Property and the Valuation of Biotechnology Companies: *GEN-dex* versus *Dow Jones*." 1997.

Malki, Elli. "Intellectual Property Intensity (IPI) and the Value-Growth Effect." Nov. 12, 1997.

Mark A. Lemley, et al., Valuable Patents, 92 Georgetown Law Journal 435 (2004).

McGavock, Daniel M. of IPC Group, Inc. "Assessing the Value of your Client's Intellectual Property Rights for Licensing, Sale or Litigation." Presentation for Knobbe, Martens, Olson & Bear, LLP. Sep. 27, 1999.

Multiple Regression http://www.2.chase.ncsu.edu/garson/pa765/regress.htm Dec. 13, 2001.

Neifeld, R.A "A Macro-Economic Model Providing Patent Valuation and Patent Based Company Financial Indicators", JPTOS vol. 83, No. 3, Mar. 2001, pp. 211-222.

Neifeld, R.A. "Patent Valuation from a Practical View Point, and Some Interesting Patent Value Statistics from the PatentValuePredictor Model", PatentCafe Magazine, downloaded from www.PatentCafe.com, Apr. 14, 2004.

Patent Evaluation Index, The Japan Technomark Foundation (Mar. 2000).

Putnam, J.D. "The Value of International Patent Rights", Ph.D. disseration, Yale University, May 1996.

Reitzig, Markus "Improving Patent Valuation Methods for Management Validating Indicators by Understanding Patenting Strategies" Oct. 2001.

Rivette, Kevin G., et al. "Discovering New Value in Intellectual Property." Harvard Business Review. Jan.-Feb. 2000.

S. Benninga, Financial Modeling, 2nd Ed., MIT Press (2000).

SA Solla, T.K. Leen, and K.R. Muller's "Learning the Similarity of Documents: An Information-Geometric Approach to Document Retrieval and Categorization," ANIPS, v. 12, pp. 914-920, MIT Press, 2000.

Savikas, "Survey Lets Judges Render Some Opinions About the Patent Bar," Nat'l L.J., Jan. 18, 1993, at 57.

Schankerman, M. and A Pakes "Estimates of the Value of Patent Rights in European Countries During the Post-1950 Period", NBER Workina Paper No. 1650, Jun. 1985.

Smith & Par, Valuation of Intellectual Property and Intangible Assets, 2nd Ed. (1989).

Survey on Solutions to Prior Art Searching Internet Patent News Service Jun. 30, 1999.

"The Anatomy of Large-Scale Hypertextual Search Engine," by Sergey Brin and Lawrence Page.

Thomas, P. "The Effect of Technological Impact upon Patent Renewal Decisions", Technology Analysis & Strategic Management, vol. II, No. 2, 1999, pp. 181-197.

Trajtenberg, M. "A Panny for Your Quotes: Patent Citations and the Value of innovations", RAND Journal of Economics, vol. 21, No. 1, Serino 1990, op. 172-181.

Trippe, Anthony. "Software Tools for Analyzing Patents," Website: www.tripp.EPSILON.go-concepts.com. Apr. 1999.

U.S. Patent and Trademark Office, Board of Patent Appeals and Interferences. Ex parts Donnor. No. 96-2552, Decided Mar. 26, 1999. 53 USPQ2d, pp. 1699-1702.

United States Patent & Trademark Office, FY 2000 USPTO Annual Report.

van der Drift, J. "Statistics of European Patents on Legal Status and Granting Data", World Patent Information, vol. 10, No. 4, May 3-5, 1988, pp. 243-249.

Willigan, Walter L "Leveraging Your Intellectual Property: A Proved Path to Value Extraction" Dec. 1998.

Winkless, B., B. O'Connor and J. Cooney "Invention Quality Measurement (IQM) 1. Patent Valuation: The Methods that TRIZ Forgot". The TRIZ Journal, downloaded from www.triz-journal.com, Sep. 2003.

\* cited by examiner

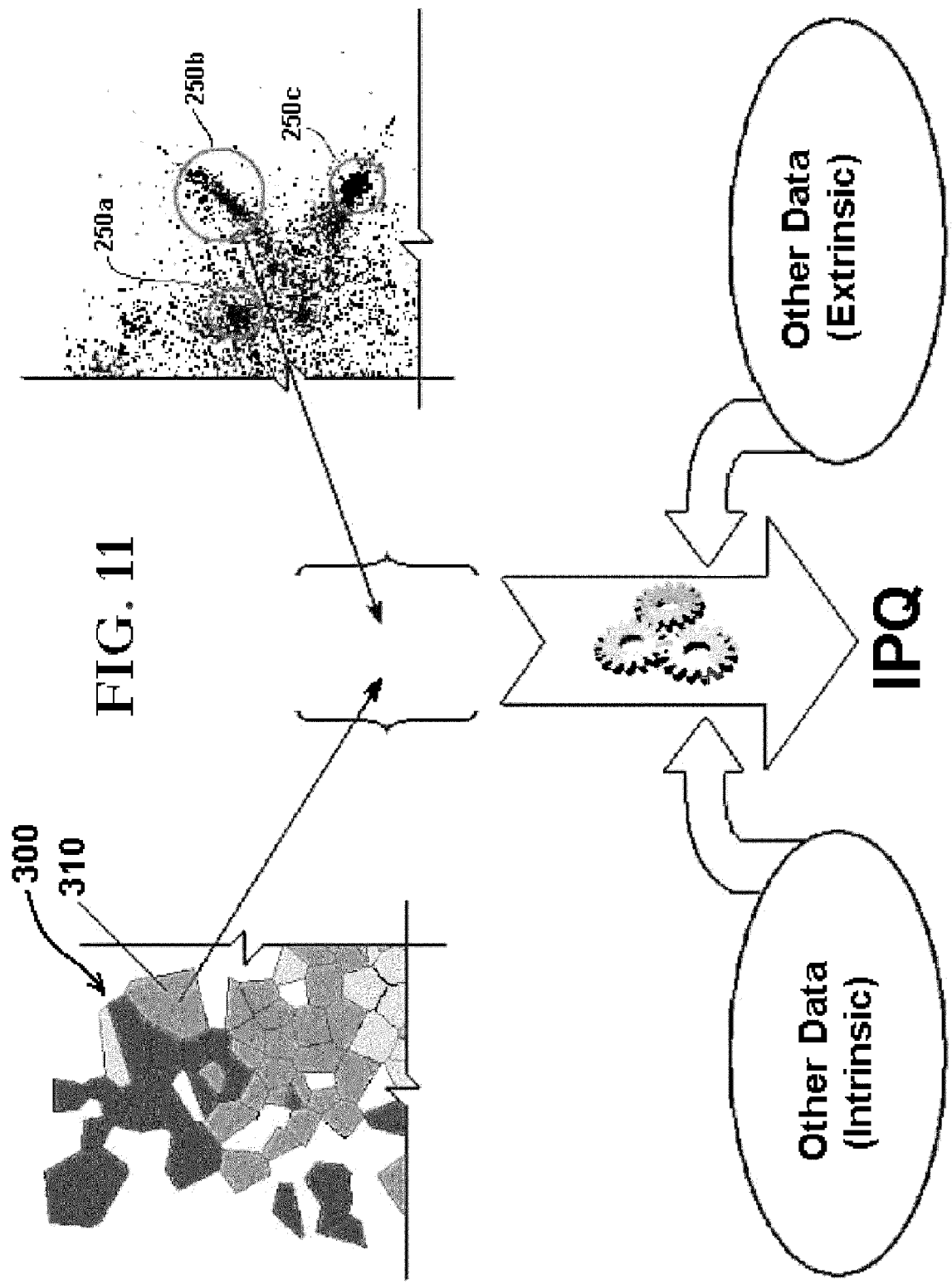

METHOD AND SYSTEM FOR PROBABILISTICALLY QUANTIFYING AND VISUALIZING RELEVANCE BETWEEN TWO OR MORE CITATIONALLY OR CONTEXTUALLY RELATED DATA OBJECTS

CROSS-REFERENCE TO RELATED APPLICATIONS

The present application is a continuation of U.S. application Ser. No. 13/958,386, filed Aug. 2, 2013, which is a continuation of U.S. application Ser. No. 13/411,441, filed Mar. 2, 2012, now U.S. Pat. No. 8,504,560, which is a divisional of U.S. application Ser. No. 12/749,381, filed Mar. 29, 2010, now U.S. Pat. No. 8,131,701, which is a divisional of U.S. application Ser. No. 11/236,965, filed Sep. 27, 2005, now U.S. Pat. No. 7,716,226, Each of the above-referenced applications are hereby incorporated by reference in their entireties.

BACKGROUND OF THE INVENTION

1. Field of the Invention

The present invention relates generally to the field of document searching, data mining and data visualization.

2. Description of the Related Art

The field of data searching and data/text mining is replete with various search methods and algorithms for helping determine the identity and/or location of documents that may have relevance to a particular subject matter of interest. The most basic search techniques involve locating specific words or word combinations within one or more of a quantity of documents contained in a database. This search methodology, while very simple to implement, suffers from a number of significant drawbacks, including slow search processing time, limited ability to construct and execute complex search queries, and other well-documented limitations inherent in the use of keywords as search criteria. Improvements to the basic keyword search include the use of structured queries (e.g., based on Boolean logic), word stemming, wildcards, fuzzy logic, contextual analysis and latent semantic analysis.

Despite its well-documented drawbacks, simple key-word based searching is still a good entry point to quickly locate documents of general interest to a relevant subject matter. It is sufficient in many searching applications to locate a particular desired piece of information contained within one or more documents being searched. However, there are many specialized searching applications, particularly in the science, technology, academic and legal fields, where keyword searching (even with the various improvements to date) provides an unsatisfactory approach for locating some or all of the relevant documents that may be of interest to a researcher. The primary underlying difficulty is that words and word phrases are imprecise by their nature. Different words and word phrases can have completely different meanings in different associative contexts. As a result, key-word based searching in these and other specialized searching applications tends to be a slow and tedious process, typically producing significant numbers of irrelevant documents or "false hits" and often failing to turn up one or more desired relevant documents.

More advanced searching techniques rely on contextual or bibliographical linkages between two or more documents. For example, U.S. Pat. No. 6,754,873 issued Jun. 22, 2004 to Law, et. al. describes a search technique for finding related hyperlinked documents located on the world-wide-web using link-based analysis. In this case backlink and forwardlink sets are utilized to find web pages that are related to a particular selected web page of interest. The resulting list of related web pages is typically sorted in accordance with a calculated relevancy score, the intent being that presumably the most relevant and/or highest quality hits would be listed toward the top of the search results page and the least relevant and/or lowest quality hits would be listed toward the bottom of the search results page.

Relevancy scores are typically calculated as an arbitrary score or metric based on one or more selected factors determined (or assumed) to be informative as to the quality or relevance of the search output relative to the search input. For example, the search engine may assign an arbitrary rank or score to each hit calculated according to the number or frequency of keyword occurrences in each document, the intent being that the total score would roughly correspond to the relevance or importance of the particular located document relative to the input search query. Another example, described in the article entitled "The Anatomy of a Large-Scale Hypertextual Search Engine," by Sergey Brin and Lawrence Page, assigns a degree of importance to a web page based on the link structure of the web page. In this manner, the Brin and Page algorithm attempts to quantify the importance of a web page based not on its content, but on the number and quality of linkages to and from other web pages.

U.S. Pat. No. 6,526,440 issued Feb. 25, 2003 to Bharat and assigned to Google, Inc. describes a similar search engine for searching a corpus of data and refining a standard relevancy score based on the interconnectivity of the initially returned set of documents. The search engine obtains an initial set of relevant documents by matching search terms to an index of a corpus. A re-ranking component in the search engine then refines the initially returned document rankings so that documents frequently cited in the initial set of relevant documents are preferred over documents that are less frequently cited within the initial set. The resulting hits in each case are typically displayed in a text-scrolled list, with the relative placement of each hit on the list being determined in accordance with the calculated relevancy score. This, in essence, is the primary search and relevance ranking algorithm behind the popular Google® search engine.

As with the Google® search engine, many of the more sophisticated search engines today are primarily optimized toward the task of searching the world wide web for relevant documents of a general-content nature and focusing typically on a single item of information or a single concept. Most searches conducted using these types of search algorithms seek to find particular items of information that are essentially known to exist and that can be described with a few simple key words. The probability that a user would be able to successfully use a search engine in this context to locate at least one source of information satisfying the user's need is fairly high. However, in certain specialized searching applications, particularly in the science, technology, academic and legal fields, conventional search engines provide an unsatisfactory approach for locating some or all of the relevant documents that may be of interest to a researcher.

For example, those skilled in the intellectual property arts and the patent legal field in general will readily appreciate the difficulty and challenge of searching through vast databases of case law, patents and related scientific documents looking for "prior art" documents relevant to a particular issued patent or pending application and/or cases relevant to a particular point of law. For patents the difficulty and challenge stems from the confluence of several unique factors affecting patents and patent-related documents. These factors include the shear volume of potentially relevant patent documents and related scientific literature (estimated at over 80 million documents worldwide), latent inaccuracies and inconsistencies in the technology classifications used by the various national and international patent offices, the complex scientific nature of patent disclosures, the ever evolving lexicon for describing novel patented concepts and structures, language translation issues in the case of relevant foreign patent documents and scientific literature, and the proclivity of patent attorneys and agents to use complex legalese and coined lexicon to describe novel concepts. The purpose of the patent search is also quite different than the normal search context. The point is not so much to find useful information relevant to a concept of interest, but to establish and document legal evidence of the existence or non-existence of a particular concept or idea in combination with one or more other related concepts or ideas at a particular point in time.

Traditional search engines are not particularly adept at efficiently handling these and other types of specialized searching applications. The standard input/output text interface of most conventional search engines also does a poor job of displaying and communicating input/output search criteria and search results in a way that facilitates intuitive understanding and visualization of the logical relationships sought to be explored between two or more related concepts being searched. It would be of particular benefit to provide an improved search algorithm, database and user interface that would overcome or at least mitigate some or all of the above-noted problems and limitations.

SUMMARY OF THE INVENTION

In one embodiment the present invention provides a novel method for probabilistically quantifying a degree of relevance between two or more citationally or contextually related data objects. Data objects may include, for example and without limitation, patent documents, non-patent documents, reported case law, web pages, personal and corporate contacts information, product information, consumer behavior, technical or scientific information, address information, and the like.

In another embodiment the present invention provides a novel method for visualizing and displaying relevance between two or more citationally or contextually related data objects.

In another embodiment the present invention provides a novel search input/output interface that displays and/or communicates search input criteria and corresponding search results in a way that facilitates intuitive understanding and visualization of the logical relationships between two or more related concepts being searched.

In another embodiment the present invention provides a novel search input/output interface that utilizes an iterative self-organizing mapping ("SOM") technique to automatically generate a visual map of relevant patents and/or other related documents desired to be explored, searched or analyzed.

In another embodiment the present invention provides a statistically optimized relevance scoring system for statistically quantifying the degree of relevance between two or more citationally and/or contextually related documents according to a calculated event probability that a particular selected relationship exists between the two or more selected documents.

In another embodiment the present invention provides an improved search algorithm having capability to statistically quantify a degree of relevance between two or more citationally and/or contextually related documents and to provide an interactive visual interface for displaying and interacting with the resulting data set.

In another embodiment the present invention provides an improved search method and algorithm for locating patent documents and/or other related documents of interest. A first group of patents is identified representing the closest known references to a particular technology or search topic of interest. Relevance analysis is performed on the first group to generate a second group of relevant patents, each having an associated relevance score to the first group. A user reviews the second group of relevant patents and selectively adds any desired additional relevant patents to the first group. The search method is iteratively repeated as many times as desired to generate a desired list of most relevant patents and/or other documents of interest.

In another embodiment the present invention provides an improved method and system for probabilistically quantifying the degree of relevance between two or more citationally and/or contextually related documents and an interactive visual interface for representing a resulting determined relevant document set in the form of a self-organizing map ("SOM") comprising one or more depicted subject matter domains or "landscapes."

In another embodiment the present invention provides an improved method and system for rating and analyzing patents using relational citation analysis in conjunction with a self-organizing mapping technique that maps or categorizes patents by iteratively adjusting or optimizing an arbitrary or scaled distance between citationally related and/or unrelated patents within a multi-dimensional space.

In another embodiment the present invention provides an improved model approach for quantitatively measuring a degree of relevance between two or more patents and/or other documents of interest and to thereby group, map and/or cluster relevant patents and related documents objectively and repeatable.

In another embodiment the present invention provides an improved model approach for quantitatively measuring a degree of relevance between two or more patents and/or other documents of interest by analyzing citational relationships between multiple related documents ("relational citation analysis"). Relational citation analysis is a novel technique that exploits citational and/or contextual relationships ("relevance links") between two or more patent documents and/or other related documents of interest for the purpose of quantitatively measuring a degree of relevance.

In another embodiment the present invention a determined relevance regression transform function is executed by a high-speed computer across an entire database of potentially relevant documents. Relevance scores are calculated between each document and each other document (or potentially relevant document) in the database and the results are stored in an accessible index so that relevance scores can be instantly accessed on the fly as needed.

In another embodiment the present invention provides an improved technique for measuring contextual relatedness or contextual similarity between two or more documents, including the steps of: i) identifying a list of words used in each document along with calculated word frequencies (number of times each word is used divided by the total word count for each document); ii) multiplying each corresponding word frequency to obtain a frequency product for each word; iii) dividing each frequency product by one-half the sum of the squares of each corresponding word frequency; and iv) taking the sum total of the result for each word.

In another embodiment the present invention provides an improved technique utilizing relevance analysis, SOM mapping, and/or ratings to measure and quantify the degree to which one or more patent portfolios may compliment each other. Relevance analysis and/or relevance scores are generated for each patent owned by a potential acquisition target relative a potential acquiring company. Higher average relevance scores indicate the presence of more complimentary patents; lower relevance scores indicate the presence of less complimentary patents.

In another embodiment the present invention provides an improved technique utilizing relevance analysis, SOM mapping, and/or ratings to identify and qualify specific patent assets and/or groups of patent assets desired to be purchased or sold through private negotiated transactions, public sales and/or private or public auctions and the like.

In another embodiment the present invention provides an improved technique utilizing relevance analysis, SOM mapping, and/or ratings to quickly identify and qualify one or more human resources (e.g., law firms, attorneys, agents, companies, universities, researchers, inventors, employees, and the like) based on particular identified technology expertise and/or work product quality.

In another embodiment the present invention provides an improved technique utilizing relevance analysis, SOM mapping, and/or ratings to provide improved semantic analysis. Preferably one or more clusters of patents and/or other related documents are identified using relational citation analysis, relevance analysis and/or SOM relevance mapping. Logical clusters are then further analyzed for word frequency usage. Similarities and/or differences are identified and analyzed using latent semantic filtering and/or other similar techniques.

In another embodiment the present invention provides an improved technique utilizing relevance analysis, SOM mapping, and/or ratings to generate dictionaries of similar and/or synonymous words. Preferably, descriptive key words appearing in patent titles of clustered patents are statistically analyzed and mapped to similar or related words appearing in the title, abstract, description or claims of the clustered patents.

In another embodiment the present invention provides an improved technique utilizing relevance analysis, SOM mapping, and/or ratings to correct and/or unify erroneous data entries, name and address variations and the like.

In another embodiment the present invention provides an improved technique utilizing relevance analysis, SOM mapping, and/or ratings to quickly and automatically identify and map commercial products or services that correlate (or likely correlate) to one or more patents.

In another embodiment the present invention provides an improved technique utilizing relevance analysis, SOM mapping, and/or ratings to measure or estimate relative claim breadth. One or more clusters of patents and/or other related documents are identified using relational citation analysis, relevance analysis and/or SOM relevance mapping. Logical clusters are then further analyzed to construct a statistical hierchy of claims and/or claim language according to determined relative breadth.

In another embodiment the present invention provides an improved technique utilizing relevance analysis, SOM mapping, and/or ratings to provide royalty benchmarking and other objective guidelines for purposes of royalty sharing, balance of payment calculations, pooling and the like. In one embodiment a regression-optimized royalty sharing formula is constructed based on relevance analysis and/or a combination of relevance analysis, claim breadth analysis and/or claim validity analysis.

In another embodiment the present invention provides an improved technique utilizing relevance analysis, SOM mapping, and/or ratings to form and operate an open patent pool loosely modeled after the American Society of Composers, Authors and Publishers ("ASCAP"). In one embodiment a large number of related and/or unrelated patents or patent interests pooled together, clustered into logical groups or licensing bundles, and licensed openly under standardized terms to various industries who may use or desire to use some or all of the patented technologies.

In another embodiment the present invention provides an improved technique utilizing relevance analysis, SOM mapping, and/or ratings to create and implement an automated conflict check system that is capable of statistically screening and monitoring potential adverse party and subject matter conflicts. In one preferred embodiment a conflicts database is created, including a unified assignee name database and name variation database and other related items of information, such as geographic location, IPC/SIC codes, assigned patents, trademarks, product names or descriptions, inventor names, executive names and/or the like. A regression algorithm is formulated and optimized to determine or estimate the risk or probability of an adverse relationship or potential conflict based on the conflicts database and certain provided input information.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments and obvious variations thereof are intended to be within the scope of the invention herein disclosed. These and other embodiments of the present invention will become readily apparent to those skilled in the art from the following detailed description having reference to the attached figures, the invention not being limited to any particular preferred embodiment(s) disclosed.

BRIEF DESCRIPTION OF THE DRAWINGS

Having thus summarized the overall general nature of the invention and its features and advantages, certain preferred embodiments and examples will now be described in detail having reference to the figures that follow, of which:

FIG. 11 is a generalized overview diagram of a modified multivariate regression model for rating and/or analyzing patents having features and advantages of the present invention.

DETAILED DESCRIPTION OF THE PREFERRED EMBODIMENT

Figure 1:
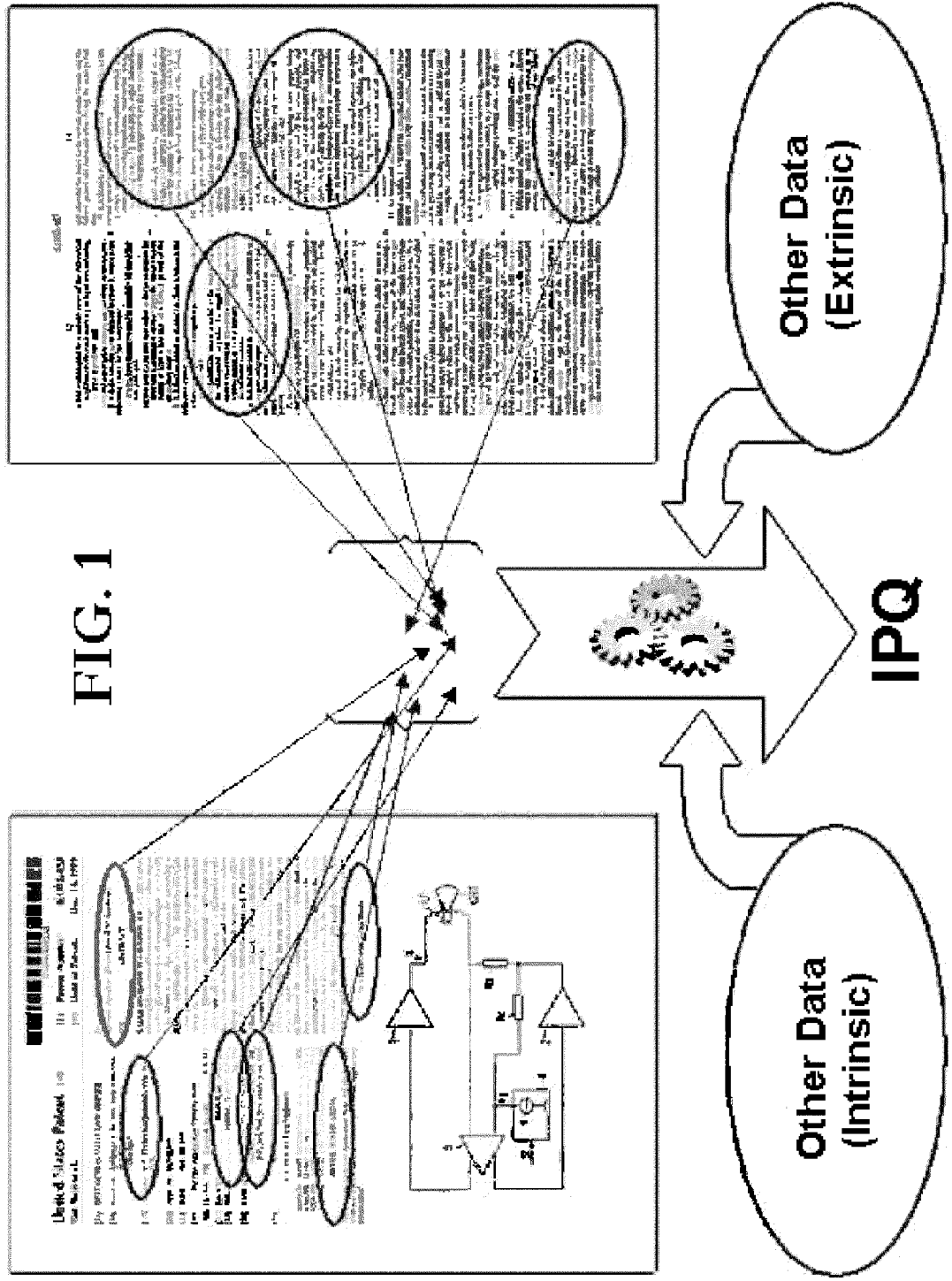
FIG. 1 is a generalized overview diagram of one preferred embodiment of a multivariate regression model for rating and/or analyzing patents and having features and advantages of the present invention.

Several preferred embodiments of the invention are described below within the specific contexts of statistically rating, valuing and analyzing intellectual property assets (namely, patents, patent applications and related documents). The invention enjoys particular advantages in these and other similar applications. However, those skilled in the art will readily appreciate that the basic invention and the various inventive concepts disclosed and described herein in detail also have broad application outside of the specific field of intellectual property. These applications include, for example and without limitation, general-use search engines for conducting searching of relevant documents or other data objects on the world-wide web and/or other databases of interest, data mining, relationship mining, degree-of-separation analysis, statistical data analysis, behavioral analysis, data analytics and automated report-generation, document scoring, rating or ranking, financial analysis, predictive analytics, Monte Carlo analysis, royalty distribution, impact analysis, automated document categorizing or classification, probabilistic latent semantic analysis, automated document handling, automated searching, machine language translation applications, legal conflict checking, data aggregation, data cleansing, expert systems, decision tree analysis, artificial intelligence, information processing, data visualization, interactive database interfaces, self-organizing mapping (SOM) solutions and other data search, analysis and visualization aids. These and other similar or related applications and obvious variants thereof will become readily apparent to those skilled in the art from the following detailed disclosure' and description of the preferred embodiments.

Patent Informatics

Patents play a critical role in encouraging private investment in new ideas and the development of new technologies that increase productivity and improve quality of life for everyone. Each year more than a quarter-million patent applications are filed in the United States Patent and Trademark Office ("PTO" or "USPTO"), resulting in the issuance of over a hundred fifty-thousand patents annually. Patent owners and applicants pay combined fees and costs of well over a billion dollars per year to the PTO to obtain and maintain their patents and applications. Patent owners collect an estimated $4-6 billion in direct licensing fees each year. They also bring thousands of infringement suits each year in the federal courts resulting in additional billions of dollars in related litigation costs, settlements and awards.

Because of the great importance of patents in the U.S. and global economies there is intense interest to identify and quantitatively analyze patents in the context of the various competitive landscapes within which they exist. The reality is that every patent and every patented technology is unique. There are good patents and bad patents; broad patents and narrow patents; patents that are well-drafted and prosecuted and others that are not so well-drafted or prosecuted. Two patents in the same industry and relating to the same subject matter can command drastically different royalty rates in a free market (or damage awards in litigation) depending upon subtle differences that affect the comparative breadth and defensibility of each patent.

Quantitative patent data, such as statistical ratings, maintenance value calculations, relevance analysis, litigation risk profiling, event probability analysis, decision tree analysis, and the like (collectively, "patent informatics"), is considered particularly valuable information. Such information can be used to help guide future R&D efforts, optimize patent filing and maintenance strategies, and provide objective guidelines and benchmarks that can help facilitate and encourage amicable settlements of patent infringement lawsuits and other patent-related disputes. Additional applications include providing objective benchmarks and guidelines for royalty sharing and patent pooling arrangements, balance of payment calculations for patent portfolio cross-licensing, internal royalty transfer calculations for tax-treatment purposes, and estimated value assessments to support a variety of financial and investment decisions.

For example, financial advisors and investors may seek to use patent informatics for purposes of comparative value analysis and/or for constructing better measures of the underlying "fundamental value" of private or publicly traded companies or for purposes of evaluating possible strategic acquisitions or as a guide to investment. Economists may seek to use such information for purposes of identifying and quantifying new or growing sectors of the economy and/or for economic forecasting and planning purposes. Various regulatory agencies, such as the U.S. Internal Revenue Service, may seek to use such information as an efficient screen for identifying potential audit targets in transactions involving, for example, charitable patent donations and royalty-based tax transfer pricing. Insurance carriers may seek to use such information to better identify and quantify relative risks within one or more technology sectors and/or for purposes of determining appropriate policy risk premiums and coverage levels for particular patents or portfolios of patents. See, e.g., U.S. Pat. No. 6,018,714, incorporated herein by reference.

Extracting useful patent informatics from vast worldwide databases of patent documents and related collateral information databases, while conceptually simple, can be quite daunting. Even after all the relevant raw information has been identified and collected, there is still the Herculean task of scrubbing, unifying and aggregating all of the relevant data fields and parsing and distilling each item of needed information to a sufficient point such that the entire body of data can be processed and analyzed intelligibly with a desired degree of granularity and drill-down capacity.

Organizing and communicating patent informatics data relative to one or more technology areas of interest can also be exceedingly difficult. Typically, patents are categorized according to a predetermined schedule of USPTO, EPO and/or WIPO patent classifications (and, occasionally, SIC codes). But the resulting categorizations are often imprecise due to the complex and ever-evolving nature of technology innovation. Subjectivity and variation among multiple human decision-makers also plays a significant role in the classification process, often resulting in inconsistent and sometimes seemingly arbitrary classifications. Individual patents may often be categorized in the "wrong" category altogether and/or they may be categorized in multiple distinct categories if, for example, no single existing classification neatly fits the technology that is the subject of a patent. This creates difficulties not only in searching for and identifying relevant or similar patents by classification designation, but it also creates a degree of imprecision when conducting statistical patent analysis and/or automated patent searching using USPTO or WIPO classifications as statistical variants or search limitations. This imprecision is particularly undesirable in the context of measuring and communicating patent informatics data relative to one or more desired technology areas that may be of interest.

Patent searching presents another particularly significant challenge. This is because of not only the shear volume of patent documents and related non-patent documents involved, but limitations of traditional key word searching across multiple technologies, chronologies, and languages. As noted above, patent classifications are notoriously prone to latent inaccuracies and inconsistencies in how the various classification categories are defined and applied by each of the national and international patent offices throughout the world. This makes the use of classification search limiters all but impractical, since limiting search results by classification creates the risk that one or more relevant documents may be missed altogether. As a result, patent searching using conventional data base queries and search engines tends to be a slow and tedious process, typically producing significant numbers of irrelevant documents or "false hits" and often failing to turn up one or more desired relevant documents. The use of relational citation analysis, in accordance with one preferred embodiment of the invention, greatly improves the ability to search, identify and categorize patent documents according to relevant subject matter.

Predictive Analytics

The use of predictive analytics tools to extract useful information from vast databases of patent and other related information has continued to gain widespread acceptance. A variety of predictive analytics tools are presently available and can be used to directly calculate estimated probability distributions of any number of desired events relative to one or more selected patent populations. Some of the more popular predictive analytics approaches (e.g., multi-variate regression analysis) have been rigorously studied and tested by noted researchers and academics with positively correlated results being reported in various peer reviewed publications. See, e.g., Mark A. Lemley, et al., *Valuable Patents*, 92 Georgetown Law Journal 435 (2004) (applying multi-variate logit regression to characterize and quantify various patent litigation risk factors). The growing appetite for more insightful and statistically predictive patent informatics has stimulated continual development of ever-more sophisticated predictive analytics tools and statistical models for extracting useful patent information.

In its simplest form predictive analytics provides a statistical and analytical tool for predicting various desired outcomes based on multiple selected input factors or input criteria. Predictive analytics is a particularly powerful tool for generating useful patent informatics from a large body of patent data stored on a database. For example, U.S. Pat. No. 6,556,992 issued to Applicant, and incorporated herein by reference in its totality, first disclosed the concept of applying a multi-variate regression analysis to one or more objective factors or metrics associated with a patent or group of patents to statistically analyze, predict and quantify patent quality, life expectancy and/or probable value. Useful rankings or ratings are derived from PTO maintenance records by determining and exploiting statistical correlations between patent maintenance rates, for example, and certain objective attributes or "metrics" revealed by the patent, its file history and/or other associated public records. The present invention, in accordance with at least one preferred embodiment, improves and expands on the essential concepts disclosed in the '992 patent.

According to one preferred embodiment of the invention, relative ratings or rankings are generated using a database of selected patent information by identifying and comparing various relevant characteristics or metrics of individual patents contained in the database. In one example, a first population of patents having a known or assumed relatively high intrinsic value (e.g. successfully litigated patents) are compared to a second population of patents having a known or assumed relatively low intrinsic value (e.g. unsuccessfully litigated patents). Based on the comparison, certain characteristics are identified as statistically more prevalent or more pronounced in one population group or the other to a significant degree.

These statistical comparisons are then used to construct and optimize a computer model or computer algorithm comprising a series of operative rules and/or mathematical equations. The algorithm is used to predict and/or provide statistically determined probabilities of a desired value or quality being present and/or of a future event occurring, given the identified characteristics of an individual identified patent or group of patents. The algorithm may comprise a simple scoring and weighting system which assigns scores and relative weightings to individual identified characteristics of a patent or group of patents determined (or assumed) to have statistical significance. For example, positive scores could generally be applied to those patent characteristics determined or believed to have desirable influence and negative scores could be applied to those patent characteristics determined or assumed to have undesirable influence on the particular quality or event of interest.

Once the basic algorithm is constructed, a high-speed computer is preferably used to repeatedly test the algorithm against one or more known patent populations (e.g. patents declared to be valid/invalid or infringed/non-infringed). During and/or following each such test the algorithm is refined (preferably automatically) by iteratively adjusting the scorings and/or weightings assigned until the predictive accuracy of the algorithm is optimized. Adjustments can be made automatically in an orderly convergence progression, and/or they can by made randomly or semi-randomly. The latter method is particularly preferred where there are any non-linearities in the equations or rules governing the algorithm. Algorithm results are preferably calculated and reported as statistical probabilities of a desired quality being present, or a future event occurring (e.g., patent being litigated, abandoned, reissued, etc.) during a specified period in the future. Algorithm results could also be calculated and/or reported as arbitrary raw scores representing the sum of an individual patent's weighted scores, which raw scores can be further ranked and reported on a percentile basis or other similar basis as desired. Preferably, the statistical accuracy of the algorithm is tracked and reported over time and periodic refinements are made as more and more data is collected and analyzed.

FIG. 1 is a generalized overview diagram of one such preferred embodiment of a multivariate regression model for rating and/or analyzing patents and having features and advantages of the present invention. In one application, the model considers a variety of individual input data points drawn from various relevant data sources and applies a statistically optimized transform function or weighting function to calculate, based on the input data, the statistical probability that one or more patents selected from a particular population of patents will be maintained or abandoned in the future. Raw probability scores are calculated and provided as output by the regression model. Optionally, the raw probability scores may be adjusted, as desired, to provide a normalized median or nominal expected score of 100. This adjusted score, dubbed the "Intellectual Property Quotient" or IPQ™, is akin to the familiar intelligence quotient or IQ used to score human intelligence. Thus, a score of 100 on the IPQ scale generally corresponds to an expected normal or median quality (average expected maintenance rate). An IPQ higher than 100 indicates above-average quality (higher expected maintenance rate) while an IPQ lower than 100 indicates below-average quality (lower expected maintenance rate).

Figure 2A:
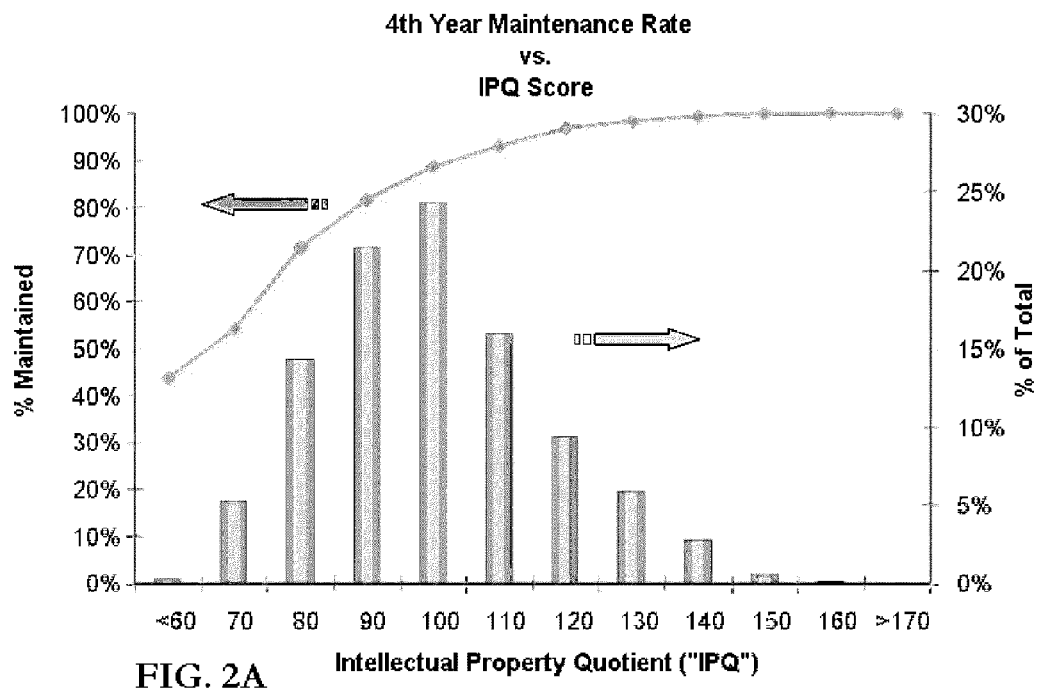
FIG. 2A is a graph illustrating how historically observed patent maintenance rates generally increase with increasing IPQ.
Figure 2B:
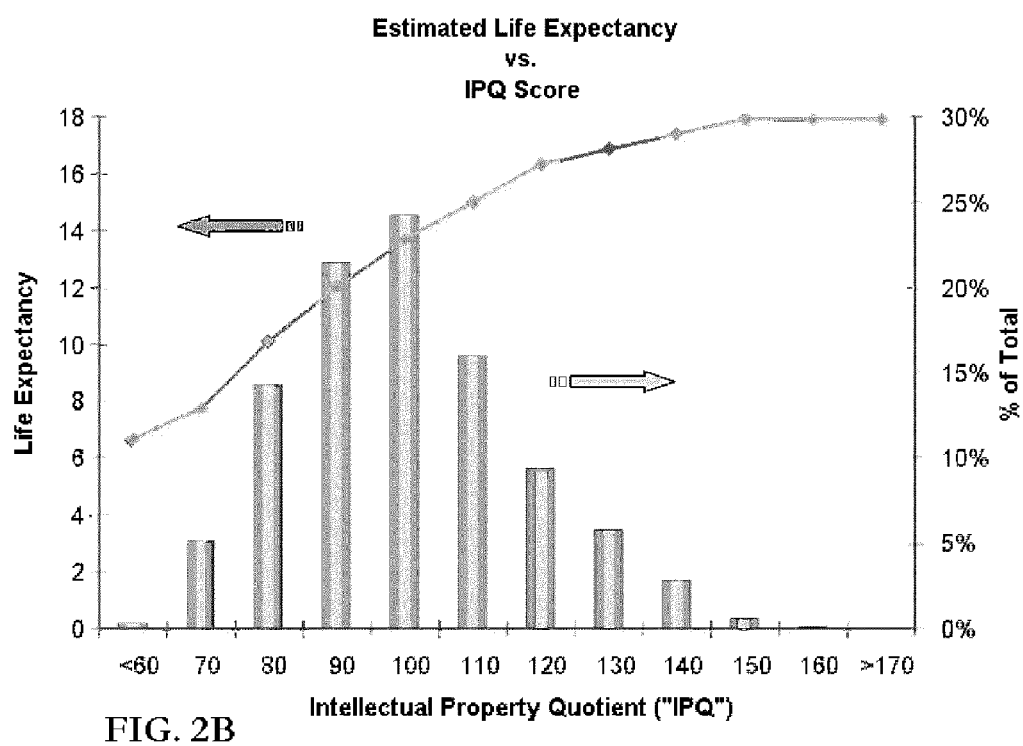
FIG. 2B is a graph illustrating how patent life expectancy generally increases with increasing IPQ.

For example, FIG. 2A shows that historically observed patent maintenance rates generally increase with increasing IPQ scores. Patents scoring 60 or less on the IPQ scale had a $4^{th}$ year maintenance rate of 43.7% compared with an average $4^{th}$ year maintenance rate of 88.6%. Patents scoring 150 or more on the IPQ scale had a $4^{th}$ year maintenance rate of 99.8%. FIG. 2B shows that patent life expectancy generally increases with increasing IPQ. Patents scoring 60 or less on the IPQ scale had an estimated life expectancy of about 6.7 years, compared with an average life expectancy of 17.9 years (full term) for patents scoring 150 or higher. The median life expectancy was about 13.7 years corresponding to an overall average full-term survival rate of about 55.9% and an IPQ score of 100.

The resulting IPQ scores can be used not only to comparatively rank patents, but also to estimate patent maintenance values (value as perceived by a hypothetical reasonable patent holder), probable commercialization rates, mortality rates and life expectancies, and other parameters of interest derived from survival analysis of statistically similar patents. See, for example, Applicant's published co-pending application, US-2004-0010393, incorporated herein by reference in its totality. IPQ scores and/or other similar patent ranking scores may also be useful, for example, in guiding patent maintenance decisions, or conducting patent valuation analysis using traditional present value analysis, income valuation analysis and/or the Black-Scholes options pricing model.

Independent regression variables may include a wide variety of statistically informative descriptive or quantifiable metrics or parameters that directly or indirectly measure or report a quality or characteristic of interest. For example, a wide variety of statistically informative metrics may be extracted from the patent document itself (direct metrics), from related sources (intrinsic metrics), and/or unrelated sources (extrinsic metrics). Direct patent metrics generally measure or report those characteristics of a patent that are revealed by the patent document itself, including its basic disclosure, drawings and claims. Specific direct patent metrics may include, for example and without limitation, the number of claims, number of words per claim, number of different words per claim, word density (e.g., different-words/total-words), length of patent specification, number of drawings or figures, number of cited prior art references, age of cited prior art references, number of subsequent citations received, subject matter classification and sub-classification, origin of the patent (foreign vs. domestic), payment of maintenance fees, prosecuting attorney or firm, patent examiner, examination art group, length of pendency in the PTO, claim type (i.e. method, apparatus, system), assignee name, inventor name, etc.

Intrinsic patent metrics generally include other relevant factors or characteristics that exist outside the four corners of the patent document itself, but that are intrinsically related to the patent. These may include, for example, the number and type of documents filed as part of the patent prosecution history. Also included in this category is the scope and contents of the prior art cited by the applicant and the examiner and various statistically informative factors derived therefrom, such as obsolescence rates, mortality rates, comparative relevancy analysis, relational citation analysis, and the like. Intrinsic patent metrics may also include a variety of other statistically derived measures such as frequency or infrequency of certain word usage relative to the general patent population or relative to a defined sub-population of patents in the same general field.

Extrinsic patent metrics generally measure or report qualities or characteristics of a patent that are not directly revealed by the patent document itself or any intrinsically associated documents, but which can be determined, derived or inferred from one or more external information sources. Examples of extrinsic patent metrics may include, without limitation, reported patent litigation results, published case opinions, patent licenses and associated royalty rates, marking of patented products, technical similarities between similar patents, resale values, collateral values, and various recorded events affecting patents (e.g., reassignments, security interests, foreclosures, bankruptcies, etc.).

The dependent regression variable preferably represents a particular quality or contingent event desired to be assessed probabilistically. The dependent variable may include, for example and without limitation, maintenance or abandonment events, quality rating or score (objective or subjective), expected economic value, collateral value, litigation risk (offensive or defensive), probability and timing of allowance (for pending applications), reissue and reexamination events, litigation events and/or outcomes, commercialization, licensing, royalty rates, and the like. In a particularly advantageous application of the invention, the dependent regression variable may be ownership identity (e.g., where ownership is not otherwise indicated or is unclear). This has particularly unique advantages in the specific applications of data scrubbing, data integrity maintenance and so-called "name unification" (discussed in more detail later).

System Architecture

Figure 3:
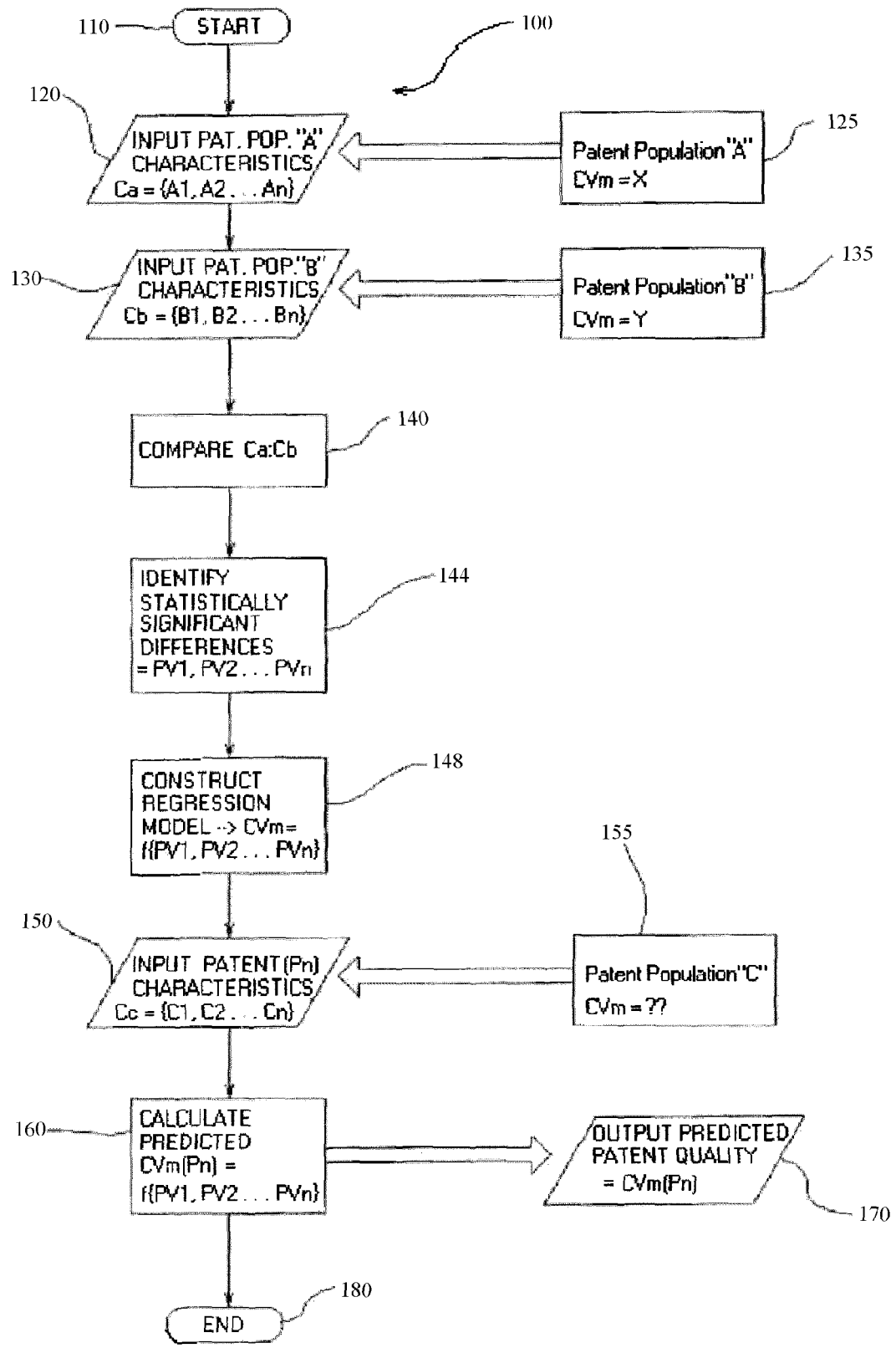
FIG. 3 is a simplified block diagram of one possible embodiment of a patent rating method and automated system having features and advantages in accordance with the present invention.

FIG. 3 is a simplified block diagram of one possible embodiment of a patent rating method and automated system 100 having features and advantages in accordance with the present invention. The system is initiated at the START block 110. At block 120 certain characteristics $C_a$ of Patent Population "A" are inputted from a database 125 in the form:

$$C_a\{A_1, A_2 \ldots A_n\}$$

where: C=set of selected characteristics of Pat. Pop. "A"
$A_n$=an individual selected characteristic of Pat. Pop. "A"

At block 130 characteristics $C_b$ of Patent Population "B" are inputted from a database 135 in the form:

$$C_b = \{B_1, B_2 \ldots B_n\}$$

where: $C_b$=set of selected characteristics of Pat. Pop. "B"
$B_n$=an individual selected characteristic of Pat. Pop. "B"

Preferably, Patent Population "A" and Patent Population "B" are selected to have different known or assumed intrinsic values and/or qualities such that a fruitful comparison may be made. For example, Population "A" may comprise a random or semi-random (e.g., representative) sample of successfully litigated patents and/or individual patent claims. Population "B" may comprise a random or semi-random sample of unsuccessfully litigated patents and/or individual patent claims. In that case, Population "A" patents/claims may be assumed to have higher intrinsic value than Population "B" patents/claims. Alternatively, and regardless of whatever assumed or intrinsic economic value the patents may have, Population "A" patents may be described as having the quality of being successfully litigated (infringement or validity), whilst Population "B" patents may be described as having the quality of being unsuccessfully litigated (infringement or validity).

By examining and comparing the characteristics of litigated patents/claims that fall into either population "A" or "B", one can make certain statistical conclusions and predictions about other patents that may or may not have been litigated. Such probabilistic analysis can also be easily extended to accurately calculate the odds, for example, of prevailing on a particular patent infringement claim or defense in a particular litigation proceeding (e.g., preliminary injunction motion, summary judgment motion, jury trial, bench trial, appeal, etc.). Such information would be of tremendous value to patent litigants, for example.

Of course, the study populations are not limited to litigated patents/claims. For example, one study population may comprise a random or semi-random sample of patents selected from the general patent population and having a representative "average" value or quality. The other study population may comprise, for example and without limitation, a random or semi-random sample of patents selected from a sub-population consisting of all patents for which $1^{st}$, $2^{nd}$ or $3^{rd}$ maintenance fees have been paid; or all patents that have been licensed for more than a predetermined royalty rate; or all patents that have been successfully reissued/reexamined; or all patents that have related counterpart foreign patents; or all patents that have been subsequently cited by other patents at least X times; etc. The number and variety of possible ways to define study populations of interest in accordance with the invention are virtually limitless.

Next, at block 140 a comparison is made between the selected characteristics $C_a$ of Patent Population "A" and the same selected characteristics $C_b$ of Patent Population "B". Based on the comparison, certain characteristics are identified at block 144 as being statistically more prevalent or more pronounced in one population or the other to a significant degree. This comparison can be performed and the statistical significance of observed differences determined by applying known statistical techniques. Thus, certain statistically relevant characteristics of each study population can be readily identified and described mathematically and/or probabilistically.

At block 148 a multiple regression model is constructed using the identified statistically relevant characteristics determined at block 144. Multiple regression modeling is a well-known statistical technique for examining the relationship between two or more predictor variables (PVs) and a criterion variable (CV). In the case of the present invention the predictor variables (or independent variables) describe or quantify the selected relevant characteristics of a particular patent population, e.g., class/sub-class, number of independent claims, number of patent citations, length of specification, etc. Criterion variables (or dependent variables) measure a selected quality of a particular patent population, such as likelihood of successful litigation (either validity or infringement). Multiple regression modeling allows the criterion variable to be studied as a function of the predictor variables in order to determine a probabilistic relationship between selected variables. This data, in turn, can be used to predict the presence or absence of the selected quality in other patents or related documents of interest. The regression model has the general form:

$$CV_m = f\{PV_1, PV_2 \ldots PV_n\}$$

where: $CV_m$=criterion variable (e.g., quality desired to be predicted
$PV_n$=predictor variable (e.g., statistically relevant characteristic)

Once the regression model is completed it can be applied at block 150 to predict the presence or absence of the selected quality in other patents selected from Patent Population "C", for example, which may be the same as or different from Populations "A" or "B." Characteristics $C_c$ of each individual patent $P_n$ to be analyzed are inputted at block 150 from a database 155 in the form:

$$C_c = \{C_1, C_2 \ldots C_n\}$$

where: $C_c$=set of selected characteristics of a patent P.
$C_n$=an individual selected characteristic of patent $P_n$ The relevant characteristics $PV_n$ of patent $P_n$ are identified and plugged into the regression model at block 160. The resulting predicted value or score $CV_m$, representing the quality of interest for patent $P_n$, is then outputted to a data output file 178, printer or other output device, as desired. The system terminates at STOP block 180.

Statistical Methodology

Many different methods of statistical analysis may be suitably employed to practice the present invention. The preferred methodology utilizes a multi-variate probit regression performed, for example, by a high-speed computer. As noted above, multiple regression modeling is a statistical technique for examining the relationship between two or more predictor variables (PVs) and a criterion variable (CV). In the case of the present invention the predictor variables (or independent variables) describe or quantify certain to observable characteristics of a particular patent population or other documents of interest, e.g., number of independent claims, length of specification, citational relationship to other patents or related documents, etc. Criterion variables (or dependent variables) measure a selected quality of interest of a particular patent population, such as likelihood of successful litigation, validity or infringement. Multi-variate regression modeling allows the criterion variable to be studied as a function of the predictor variables in order to determine a probabilistic relationship between selected variables. This data, in turn, can be used to predict the presence or absence of the selected quality in other patents or related documents of interest.

For example, if one were interested in examining the relationship between the number of times the word "means" is used in a claim (the PV) and a finding of infringement in litigation (the CV), one could use the following simple linear regression model:

$$Y = a + bXi$$

Where:

Y=criterion variable (likelihood of patent infringement)

Xi=predictor variable (number of times "means" appears)

a=the Y-intercept (% found infringed where Xi=0)

b=the rate of change in Y given one unit change in Xi

The coefficients a, b can be determined by iteration or other means so that the sum of squared errors is minimized in accordance with the well-known ordinary least squares (OLS) technique or other specified error function. Given least squares or other error optimization, the absolute mean of the errors will typically be driven to zero.

Figure 4:
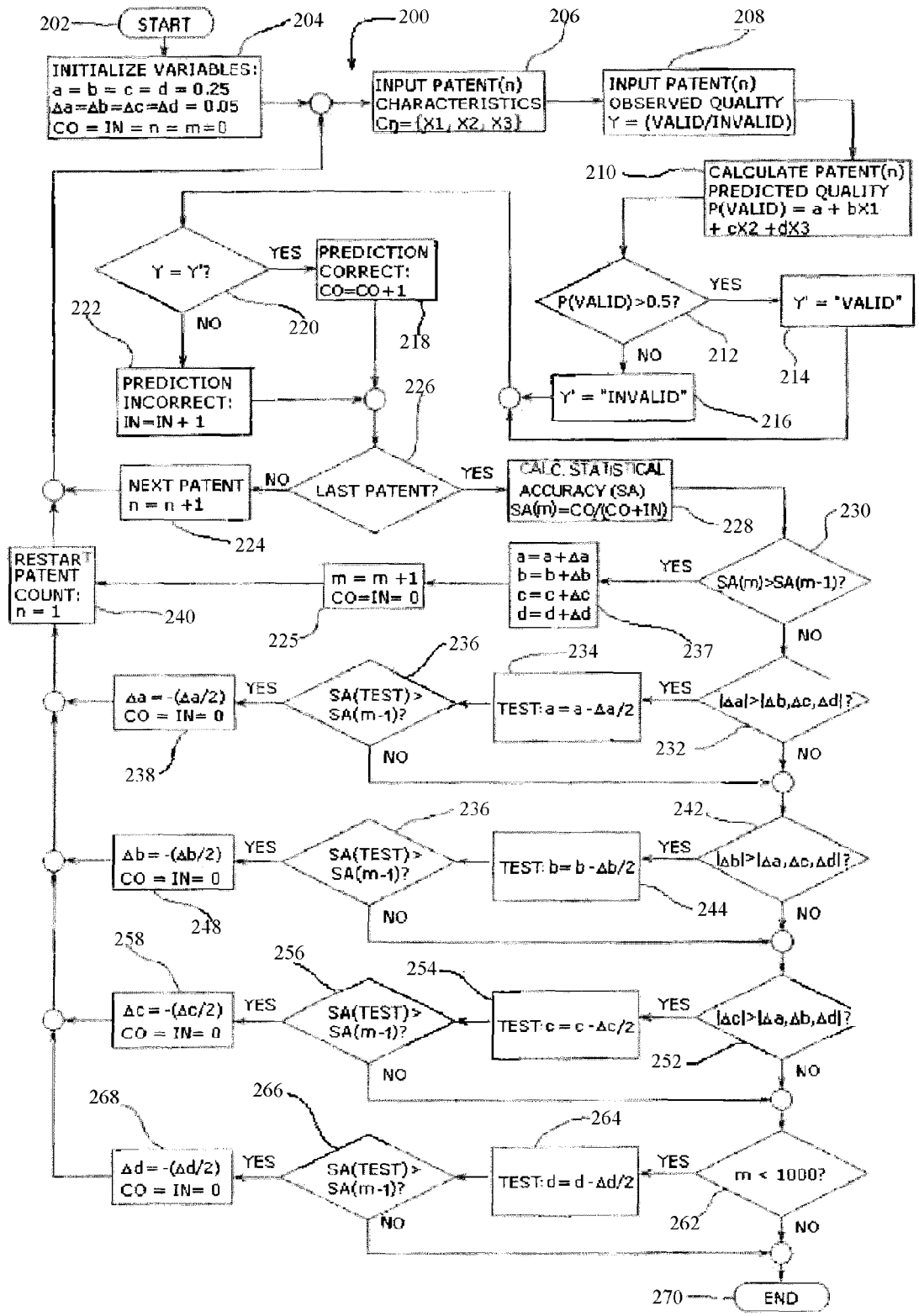
FIG. 4 is a simplified schematic flow chart of one suitable multi-variate regression technique that may be employed in carrying out the present invention.

The above example is a single-variable, linear regression model. In carrying out the present invention, those skilled in the art will readily appreciate that it may be desirable to include a number of different predictor variables (PVs) in the regression model (expressed either as linear or non-linear functions and/or rules) in order to extract as much useful information as possible from the available data. There are a wide variety of commercially available software platforms (e.g., StatGraphics) and various regression techniques (e.g., linear regression or probit regression) for conducting multi-variate regression modeling. FIG. 4 is a very simplified schematic flow chart 200 of one such suitable multi-variate regression technique that may be employed in carrying out the present invention.

The flow chart begins at the START block 202. At block 204 certain system variables are initialized. These include multi-regression coefficients a, b, c and d, incremental step changes $\Delta a$, $\Delta b$, $\Delta c$ and $\Delta d$ for each coefficient a, b, c and d, respectively, and various counters CO (# correct predictions), IN (# incorrect predictions), n (# patent in population) and m (loop repeat count). At step 206 the system inputs selected characteristics ($C_n = X_1, X_2, X_3$) of the next patent (n) in the study population (e.g., litigated patents). Preferably, the characteristics $X_1, X_2, X_3$ have been previously selected and determined to have a statistically significant impact on the selected patent quality desired to be measured. At step 208 the observed patent quality Y of patent n is inputted into the system. In this case, the patent quality of interest is the validity or invalidity of the patent as determined by a final judgment of a court. Alternatively, the measured patent quality could be any one or more of a number of other qualities of interest such as discussed above.

At step 210 the system calculates a predicted patent quality such as the probability that the patent in question is valid P(valid). In this case, a simple linear multi-regression model is chosen having the form:

$$P(\text{valid}) = a + bX_1 + cX_2 + dX_3$$

where:

P(valid)=predicted probability of patent validity $X_1, X_2, X_3$ are various predictor variables a=Y-intercept (% found valid where $X_1, X_2, X_3$=0)

b,c,d=rate of change in P(valid) per unit change of $X_1, X_2, X_3$

Once the probability of validity is calculated, the system at step 212 determines an expected quality Y' based on the probability P(valid). In particular, if P(valid) is calculated to be greater than 0.5 (>50%) then the expected outcome Y' is that the patent is "VALID" as indicated by block 214. If P(valid) is calculated to be less than 0.5 (<50%) then the expected outcome Y' is that the patent is "INVALID" as indicated by block 216.

The expected patent quality or outcome Y' is then compared to the actual observed patent quality Y at step 220 and a determination is made whether Y=Y' indicating a correct prediction (block 218) or whether Y<>Y' indicating an incorrect prediction (block 222). In the case of a correct prediction the counter CO is incremented. In the event of an incorrect prediction, the counter IN is incremented. If patent(n) is not the last patent in the study population, then decision bock 226 directs the system to loop back again repeating the above steps 206-226 for the next patent n=n+1 in the population and incrementing the patent counter n at block 224. If patent(n) is the last patent in the population (n=#pop) then decision block 226 directs the system to begin a statistical analysis of the regression model.

This analysis begins at block 228 wherein the statistical accuracy (SA) of the model (m) is calculated using the equation:

$$SA(m) = CO/(CO+IN)$$

where

SA(m)=statistical accuracy of regression model (m)

CO=number of correct predictions for model (m)

IN=number of incorrect predictions for model (m)

The statistical accuracy SA(m) is a simple and easily calculated measure of how much observed data was accurately accounted for (i.e. correctly predicted) by the regression model (m). This is a very basic measure of the predictive accuracy of the regression model and is described herein by way of example only. If desired, a more sophisticated approach, such as variance analysis, could also be used to accurately measure the predictive power of a given regression model (m).

Variance analysis measures the variance in the criterion variable (e.g., Y') as a function of each of the predictor variables (e.g., $X_1, X_2, X_3$). The measured variance in the criterion variable (Y') can be broken into two parts: that predicted by one or more of the selected predictor variables and that variance not predicted by the selected predictor variables. The latter is often referred to as "error variance." The total predicted variance is the amount of variance accounted for by the regression model. For instance, if the predicted variance is 0.78—this means the regression model is accounting for 78% of the possible variance. Of course, it is important and desirable to account for as much variance as possible with a given regression model. The more variance one can account for, the more confidence one has about the predictions made by the regression model.

Predicted variance can also be increased by adding more predictor variables to the regression model. But, as the number of predictor variables in the regression model increases beyond a certain point there is a risk that the predicted variance may become artificially inflated, indicating that the model is purporting to account for variance that is not actually accounted for in the population. This problem may be controlled by selecting an appropriate number of predictor variables in a given model in accordance with the number of samples in the population. Preferably, the number of predictor variables is no more than about 5-10% of the total number of samples in a given population and is most preferably less than about 1-3% of the total population. Thus, for a patent population size of 1,000, preferably the number of predictor variables is no more than about 50-100 and most preferably no more than about 10 to 30 total, or between about 15-25. Alternatively, where it is desirable to use more predictor variables in a given regression model, an adjusted predicted variance may be calculated using well-known techniques which take into account both the number of predictor variables and the sample size.

Decision block 230 compares the calculated statistical accuracy SA(m) of the current regression model (m) to the statistical accuracy SA(m−1) of the previous regression model (m−1). If the statistical accuracy SA(m) indicates improvement, then decision block 230 directs the system to coefficient adjustment block 227. This block increments or decrements one or more of the coefficients (a, b, c and d) by a predetermined amount ($\Delta a$, $\Delta b$, $\Delta c$ and $\Delta d$). The adjustment amounts (+ or −) are periodically determined by the system 200 to accurately converge the regression model toward maximum statistical accuracy SA. This may be done in a variety of ways. One simple linear convergence technique is described below.

If decision block 230 determines that SA(m)<SA(m−1), this indicates that the current regression model (m) is a worse predictor of the desired patent quality than the previous regression model (m−1). Therefore, a different adjustment is needed to be made to the coefficients a, b, c, and/or d in order to cause the system to reconverge toward the optimal solution providing for maximum predictive accuracy. This is done by directing the system to blocks 232-268 to test the impact of various changes to each predictor variable (a, b, c, d) and to change one or more of the coefficient adjustment amounts ($\Delta a$, $\Delta b$, $\Delta c$ and $\Delta d$) as necessary to reconverge on the optimal solution.

Preferably, course adjustments are made first and then finer and finer adjustments are continually made as the regression model converges on an optimal solution having maximized statistical accuracy SA. Thus, decision blocks 232, 242, 252 and 262 first preferably determine which of the adjustment amounts ($\Delta a$, $\Delta b$, $\Delta c$ and $\Delta d$) is greatest in magnitude. For example, if it is determined that $\Delta a$ is greater than each of the adjustment amounts $\Delta b$, $\Delta c$ and $\Delta d$, then decision block 232 directs the system to block 234.

Block 234 tests a modified regression model (m−1) where $a=a-\Delta a/2$. If the modified regression model results in improved statistical accuracy such that:

$$SA(TEST) > SA(m-1)$$

then decision block 236 directs the system to block 238. Block 238 inverts and reduces the adjustment amount $\Delta a=-(\Delta a/2)$ and reinitializes the counts CO and IN to zero. Block 240 reinitializes the patent count to n=1. The system then resumes normal operation starting at block 206.

If the modified regression model does not result in improved statistical accuracy, decision block 236 directs the system to the next decision block 242 to determine whether an adjustment to one of the other coefficients might improve the accuracy of the regression model. The process of adjusting the coefficients and testing the accuracy of a new adjusted regression model repeats until decision block 262 determines that the system has cycled through a predetermined number of models, in this case m=1000. At this point the system stops at END block 270, whereby the data may be extracted and studied or used to provide quality ratings or rankings of patents outside (or inside) the study populations as described above. If there are any non-linear relationships between the criterion variable and any predictor variable(s), it is preferred to randomize the variable coefficients at least periodically and reconverge toward an optimal solution in order to fully explore all possible optimal solutions.

Multi-variate regression modeling, as described above in connection with FIG. 4, is particularly well suited to carrying out the methods of the present invention. The methodology allows one not only to determine a statistical relationship between a criterion variable (CV) of interest and a number of predictor variables (PVs), it also allows one to determine the independent contributions of each predictor variable in the model by allowing for partitioning of variance. In other words, one can determine how much variance in the criterion variable is accounted for by a specific predictor variable. This can be accomplished, for example, by removing the PV in question from the model and then determining if the correlation predicted by the model significantly declines when the predictor variable is removed from the equation and the other predictor variables remain.

Partitioning of variance is also useful in detecting possible collinearity or multi-collinearity between two of more predictor variables. Collinearity occurs when all or most of the variance in one predictor variable is accounted for by one other predictor variable. Multi-collinearity exists when several predictor variables combined account for all or most of the variance of another predictor variable. While not directly detrimental to the utility of the invention, collinearity or multi-collinearity can create problems where it is desired to accurately determine the slope or direction of an individual regression line for a particular predictor variable. Collinearity or multi-collinearity can be reduced or eliminated by removing superfluous predictor variables and/or by combining two or more predictor variables into a single normalized predictor variable.

Relevant information which may be analyzed in accordance with the invention herein disclosed may include any variety of useful information for which statistical probabilities can be calculated, including, without limitation: specific anticipated abandonment events ($4^{th}$, $8^{th}$, $12^{th}$ year maintenance payments), litigation risk (e.g., likelihood of initiation, success and/or failure), maintenance value, market value, royalty rates, commercialization rates, relevancy to one or more other patents, subject matter relevancy, identity of ownership (where it is not indicated or is otherwise uncertain), and the like. A wide variety of derivative and/or aggregated analyses can also be performed, such as ratings or rankings of individual patents or patent portfolios; ratings or rankings of patent portfolios held by public corporations; ratings or rankings of patent portfolios held by pre-IPO companies; ratings or rankings of individual named inventors; and ratings or rankings of professional service firms, law firms and the like who prepare, prosecute and enforce patents or other intellectual property assets.

Relevance Analysis

When rating, analyzing or evaluating a single patent application, patent or a portfolio of patents or other documents it is often informative and/or desirable to identify a group of most closely related patents (a "peer group"). For example, it may be desirable to identify the closest prior art to a disclosed or patented invention. It may also be statistically informative or desirable to measure the frequency of a particular quality or event of interest (e.g., abandonment, litigation, reassignment, citation, key word usage, etc.) having either occurred or not occurred within an identified peer group population. For purposes of conducting statistical analysis it is particularly important and desirable to define relevant peer groups in a manner that is objectively determinable and repeatable. Otherwise, it may be difficult to draw statistically valid conclusions from comparative analysis thereof and/or to extrapolate the results of the comparative analysis to other patents or other peer group documents. It is also particularly desirable, especially when constructing and optimizing regression algorithms utilizing quality-specific or event-specific input data from one or more selected relevant patents or other documents, to be able to quantitatively measure in an absolute probabilistic sense the degree of relevance between the document of interest and each selected relevant document for purposes of appropriately selecting and/or weighting specific input data.

One very simple and useful way to define relevant peer groups of patent documents is to group according to primary classifications and/or subclassifications assigned by the USPTO. For example, TABLE 1 below summarizes observed maintenance rates for a statistically relevant sample of U.S. utility patents categorized by the USPTO into several different primary classifications.

TABLE 1

| Class | Description | Maint. Rate |
|---|---|---|
| 482 | Exercise Equipment | 21% |
| 473 | Golf Clubs/Equipment | 26% |
| 446 | Toys and Amusement Devices | 30% |
| 206/250 | Packaging | 43% |
| 365/364 | Computers | 55% |
| 935 | Genetic Engineering | 56% |

As TABLE 1 illustrates, patents classified in Class 482 ("Exercise Equipment") had an average maintenance rate of 21% (79% of patents abandoned prior to full term), while patents classified in Class 935 ("Genetic Engineering") had an average maintenance rate of 56% (44% of patents abandoned), and patents classified in Class 935 ("Computers") had an average maintenance rate of 55% (45% of patents abandoned). It can be demonstrated from this and other data that USPTO primary patent classifications are statistically informative of observed patent maintenance rates.

However, patent classifications are notoriously prone to latent inaccuracies and inconsistencies in how classifications are defined and applied by the various national and international patent offices. Typically, patents are categorized according to a predetermined schedule of USPTO or WIPO patent classifications and/or SIC codes. But the resulting categorizations are often imprecise due to the complex and ever-evolving nature of technology innovation. Subjectivity and variation among multiple human decision-makers also plays a significant role in the classification process often resulting in inconsistent and sometimes seemingly arbitrary classifications. Individual patents may often be categorized in the "wrong" category and/or they may be categorized in multiple distinct categories if, for example, no single classification neatly fits the technology that is the subject of a patent. This creates imprecision when conducting automated patent analysis using USPTO or WIPO classifications as peer group identifiers and can also produce excessive "granularity" in the sense that the classification group overall (or class/subclass combination) may not fairly represent the particular patent of interest.

Many other alternative approaches for clustering, categorizing and/or measuring similarity between two or more documents have been proposed. For example, one leading approach is explained in S. A. Solla, T. K. Leen, and K. R. Muller's *"Learning the Similarity of Documents: An Information-Geometric Approach to Document Retrieval and Categorization,"* ANIPS, v. 12, pp. 914-920, MIT Press, 2000. This approach uses probabilistic latent semantic analysis (PLSA) to create arbitrary vectors describing documents and then measures the similarity of those vectors. PLSA essentially models documents as unstructured groups of words in which the importance of any particular word is unrelated to the structure of the underlying document or the occurrence of other words in the document. The PLSA model assumes that documents are combinations of "latent classes" or factors, each of which has a different word frequency probability distribution. It then attempts to identify the set of latent factors (e.g., key words) that best explains a corpus of documents by maximum likelihood estimation. Once a set of latent factors has been identified, the semantic similarity between any two documents or sets of documents can be measured by decomposing each document or set of documents into a series of factor representations and then taking the factor-weighted dot product of each resulting series to produce a similarity score.

In certain applications, such as simple text classification, and context-based searching, these and other similarly-derived PLSA functions can be used to create effective document classifiers or identifiers (i.e., sets of descriptive keywords or subject matter identifiers). However, they are not generally able to effectively exploit or account for context-specific features and unique contextual structures and underlying contextual meanings of documents that may make them more or less similar, or nuances of "similarity" that might occur in different contextual scenarios or circumstances. They also do not provide a measure of "relevance" in the absolute sense of an event-specific probability. Rather, they typically provide only an arbitrary or relative measure of contextual "similarity" based on observed overlap of the various latent factors identified.

To overcome these and/or other difficulties and to generally provide an improved model approach, a novel relevance assessment technique is used to quantitatively measure the degree of relevance between two or more patents and/or other documents of interest and to thereby group, map and/or cluster relevant patents and related documents objectively and repeatably. A suitable relevance assessment technique is preferably based in whole or in part on a statistical analysis of the citational relationships that exist between multiple related documents ("relational citation analysis").

Relational citation analysis is a novel technique that exploits citational and/or contextual relationships ("relevance links") that may exist between two or more patent documents and/or other related documents of interest for the purpose of quantitatively measuring a degree of relevance. The primary assumption underlying the approach is that patent documents and/or other documents that are citationally related to one another at the first generation (one document directly citing the other) are "relevant" to one another. In other words, if document X directly cites (refers to or mentions) document Y (or vice versa, or both), then documents X and Y are considered to be citationally related at the first generation and are therefore deemed or assumed to be "relevant" to one another. If document X cites document Z which, in turn, cites document Y, then documents X and Y are considered to be citationally related at the second generation and are potentially relevant to one another according to a particular derived relevance probability distribution. Specifically, it has been determined that the occurrence of a citational relationship between any two documents at a second generation creates a corresponding measurable probability that the documents may be citationally related at the first generation. Thus, "relevance" between any two documents can be defined and measured in the absolute sense of an event-specific probability that the documents are citationally related at the first generation.

For specific purposes of the description that follows, the term "relevance" shall be used and intended herein to mean in its broadest sense any probabilistically measurable event that defines a predetermined relationship between two or more documents. Preferably, the predetermined relationship comprises a citational relationship at the first generation. In alternative embodiments of the invention it may be more useful or convenient to adopt a modified or alternative definition of relevance, such as probability of classification overlap, probability of a particular threshold contextual overlap, probability of examiner citation, and/or some combination thereof. For specific purposes of the description that follows, the term "relevance link" shall be used and intended herein to mean any measurable or discernable relationship that exists between two or more patent documents or other documents of interest that is or may be statistically informative of relevance. Suitable relevance links may include, for example and without limitation, citational relationships, contextual relationships, contextual similarity, PLSA similarity scores, other relevance scores, classification or categorization overlap, common examiner, common art group, common authorship or inventorship, patent family overlap, common ownership, common geography, and the like.

Given a suitable definition of relevance, a statistical relevance score can be mathematically expressed as the simple event probability that two or more documents of interest will have a relationship that satisfies the relevance definition (e.g., that they are citationally related at the first generation). Thus, for example, two documents having a direct citational relationship (one document directly citing the other document) can, in accordance with one preferred embodiment of the invention, be described as having a relevance score of 1, indicating 100% probability of a direct citational relationship. Two documents having no citational relationship and no possible likelihood of a citational relationship at the first generation can be described as having a relevance score of 0, indicating 0% probability of a direct citational relationship. Thus, any two patent documents or other documents of interest selected from a given population can be characterized as having a certain relevance score calculated as the simple event probability that one or both documents would directly cite or reference the other.

It has been further discovered through empirical analysis that there is a strong statistical covariance between citational relationships occurring at the first generation and citational relationships occurring at the second and higher generations. Intuitively, this makes some sense. Two patents or other documents that cite one another are also more likely to cite other contextually similar documents as well, thereby creating second generation and higher citational relationships. As a result of this strong covariance, a powerfully predictive probit or logit regression model can be constructed using the first generation citational relationship as the dependent variable (criterion variable sought to be predicted) and the second and higher generation citational relationships as independent variables (predictor variables). A suitably constructed regression model can then be optimized to calculate the event probability $p(R)$ that a first-generation citational relationship exists between any two documents of interest by examining the number and type of citational relationships that may exist at the second generation and higher.

Figure 5:
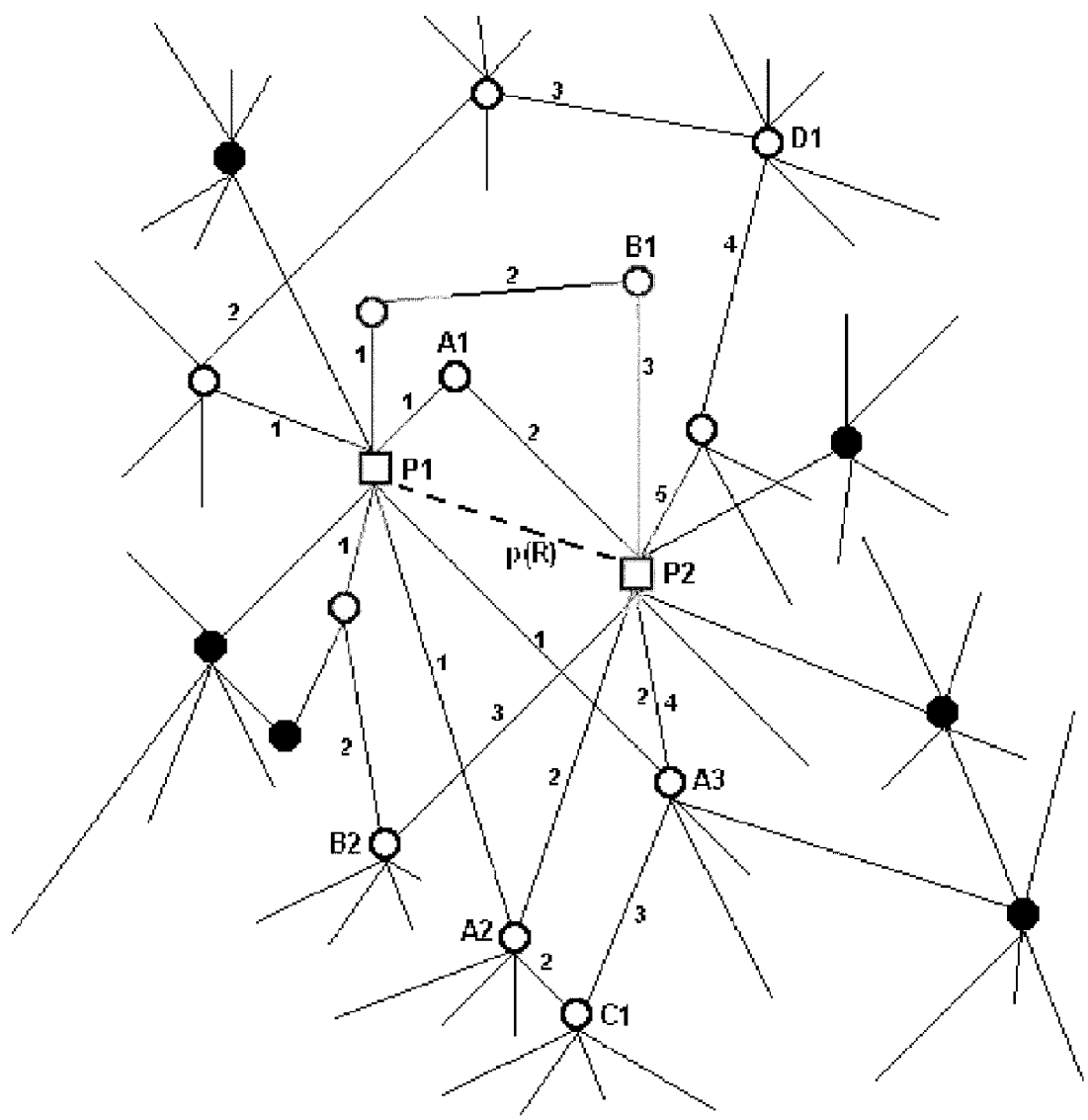
FIG. 5 is a simplified schematic diagram illustrating one preferred approach for determining and measuring multi-generational citational relationships between two or more selected documents.

FIG. 5 illustrates one preferred approach for determining and measuring multi-generational citational relationships between two or more selected documents. In this case two patent documents (or other documents) P1 and P2 are selected for which it is desired to quantify the degree of relevance or relevance score. Each document P1 and P2 is citationally related to a total of 8 other documents at the first generation. This includes in each case 4 "backward" cites (document of interest citing earlier documents; illustrated depending from below) and 4 "forward" cites (later documents citing document of interest; illustrated extending from above). Preferably (though not necessarily), we ignore for now any actual citational relationship that may exist between documents P1 and P2 at the first generation since this is the dependent variable sought to be determined in the regression.

Using basic computer database logic we extend multiple generations of citations and/or other relevance links from each document P1 and P2 and we identify and count the number of shared or overlapping citations at each generation. Thus, for example we identify 3 overlapping citational relationships at the second generation ("GEN2") citing common documents A1, A2 and A3. Note that in each case A1-A3, we can count a total of 2 citational links separating document P1 from document P2, corresponding to a second generation citational relationship. Similarly, we see there are a total of 2 citational relationships occurring at the third generation ("GEN3"), citing common documents B1 and B2. Finally, we see there is 1 citational relationship occurring at each the fourth and fifth generations ("GEN4" and "GEN5"), citing common documents C1 and D1, respectively.

The determined count of citational relationships at each generation 2-5 are all preferably provided as input predictor variables (independent variables) to a multi-variate probit regression model. The regression model is preferably formulated and optimally adjusted to predict the existence or absence of a first generation citational relationship between documents P1 and P2 (whether such relationship actually exists or not) and/or some other objective relationship based on some or all of the input predictor variables provided. The resulting probability score (and/or a mathematical derivation thereof) is an objective and repeatable probabilistic quantification of the likely relevance between documents P1 and P2.

Optionally, if desired, the citation counts at each generation could be weighted, scored or otherwise normalized so that, for example, documents with particularly heavy citations (backward or forward) do not disproportionately affect the regression results. For example, one particularly preferred weighting method is to divide the citation count at each generation according to the total number of citational relationships. Another preferred approach is to effectively distribute a citation "credit" for each document, which credit is split or divided from generation to generation substantially inversely proportional to the number of citational relationships at each generation. Other suitable weighting approaches and obvious variations and improvements thereto will become readily apparent to those skilled in the art.

Optionally, any number of additional statistically informative metrics or relevance links could also be provided as independent input predictor variables, as desired. These may include, for example and without limitation, various measures of contextual similarity or relatedness (e.g., number of overlapping key words in the title, abstract, claims and/or detailed description), subject matter categorizations, subject matter key word descriptors, authorship, sponsorship, ownership, geographic associations, and the like. Alternatively, some or all of the second generation and higher relational citation input predictor variables may be omitted if desired. For example, it may desired to calculate a relevance score (e.g., probability of a first generation citational relationship) based solely or partly on one or more other factors or relevance links, such as various factors measuring contextual relatedness and the like.

One particularly preferred technique for measuring contextual relatedness or contextual similarity between one or more patent documents and/or other documents of interest is to count the number of common or overlapping words in the title, abstract, claims and/or description, and weighting each word substantially inversely to its determined frequency within a statistically relevant sample of similar documents. Preferably, separate weighted word counts would be generated for each of the title, abstract, claims and detailed description portions of each selected document. These, in turn, are preferably provided as additional independent regression variables to help improve and optimize the predictive power of the regression algorithm for measuring relevance.

Another particularly preferred technique for measuring contextual relatedness or contextual similarity between two or more documents P1, P2 is to: i) identify a list of words used in each document along with calculated word frequencies (number of times each word is used divided by the total word count for each document); ii) multiply each corresponding word frequency to obtain a frequency product for each word; iii) divide each frequency product by one-half the sum of the squares of each corresponding word frequency; and iv) take the sum total of the result for each word. In formulaic terms this may be expressed as:

$$CR = \sum_{1}^{n} \left[ \frac{f(wn, P1) * (f(wm, P2)}{1/2 * \{f(wn, P1)^2 + f(wn, P2)^2\}} \right]$$

where:
CR=Contextual Relatedness Score [0145]
f(wn, P1)=frequency of word n in document P1
f(wn, P2)=frequency of word n in document P2

Those skilled in the art will readily appreciate that if two documents P1, P2 are contextually identical (contain the same number and frequency distribution of words), then the calculated contextual relatedness score (CR) in accordance with the above formula will equate to 1. To the extent that two documents P1, P2 contain different words and/or different frequencies of word usage, then the calculated contextual relatedness score (CR) in accordance with the above formula would equate to something between 0 and 1. Those skilled in the art will readily appreciate the above formula can be modified and/or improved to selectively weight or ignore particular words according to their frequency or infrequency of usage in a selected statistically relevant population of similar documents. For example, it would be highly desirable to selectively ignore and/or reduce the weighting of frequently used words and selectively consider and/or increase the weighting of infrequently used words. Optionally, the approach can be similarly extended to selectively count and appropriately weight overlapping combinations of words and/or concepts as an alternative or improved measure of contextual relatedness between two or more documents.

Those skilled in the art will also appreciate that contextual relatedness can be measured relative to any or all desired portions of a patent or other document of interest, including basic portions corresponding to the title, abstract, claims and/or the detailed description. Contextual relatedness can also be measured with respect to an identified group of documents having a centroid or combined word frequency distribution and/or with respect to particular portions of a single document to itself (e.g., claims versus detailed specification or Claim X versus Claim Y).

Preferably, relevance analysis and the determined relevance regression transform function is executed by a high-speed computer across an entire database of potentially relevant documents. More preferably, relevance scores are calculated between each document and each other document (or potentially relevant document) in the database and the results stored in an accessible index so that relevance scores can be instantly accessed on the fly as needed. Advantageously, a relevance index constructed and stored in this manner would enable substantially faster and more fruitful searching and analysis of relevant patent documents and/or other citationally or contextually related documents than heretofore possible using conventional searching and indexing techniques.

Relevance Mapping

Conventional search engines typically provide a standard input/output text interface for entering and refining search queries and for displaying and communicating relevant search results. The popular Google™ search engine, for example, is typical of most general-application search engines for searching relevant documents on the world wide web using key-word searching and Boolean search query structures. The USPTO patent search engine is typical of many in the patent search space, which provide multiple text-input boxes corresponding to various key-word-searchable fields, such as patent title, abstract, description, inventor name, assignee name, and the like. These simple interfaces are generally useful for routine searching, but are less than ideal for more complex searching applications such as legal, scientific and patent prior art searching.

Figure 6:
FIG. 6 is a 2-dimensional self organizing map ("SOM") generated in accordance with one preferred embodiment of the present invention.

It would represent a tremendous improvement in the art to provide a search input/output interface that displays and/or communicates search input criteria and corresponding search results in a way that facilitates intuitive understanding and visualization of the logical relationships between two or more related concepts being searched. Preferably, a novel iterative self-organizing mapping ("SOM") technique is utilized to automatically generate a visual map of relevant patents and/or other related documents desired to be further searched or analyzed. For example, FIG. 6 shows a 2-dimensional SOM map 300 generated in accordance with one preferred embodiment of the present invention. The map generally represents a selection of patents from the aerospace technology space. Each individual dot 310 represents an individual patent and each patent has an associated X-Y coordinate that "maps" the patent within an arbitrary 2-dimensional space or patent domain, as illustrated.

There are several possible techniques to construct the map 300. In a first technique a relevant group of patent documents and/or related documents is selected. Relevant documents may be selected by classification, key word searching, relational citation analysis, and/or any other desired selection technique. Next, space coordinates (e.g., X-Y, X-Y-Z, etc.) are preferably selected and assigned to each patent in the given space such that the representative dots 310 are generally distributed in an organized, arbitrary, random or semi-random pattern. An iterative algorithm is then applied to optimize an arbitrary or scaled distance between citationally related and/or unrelated patents (or other documents) within the multi-dimensional space.

In one particularly preferred embodiment, the mapping algorithm seeks to maximize (on a relative scale) the distance or the square of the distance (or other exponentiated distance) between citationally unrelated patents and to minimize (on a relative scale) the distance or square of the distance (or other exponentiated distance) between citationally related patents. As the algorithm is iteratively and repeatedly applied to each patent within the space, the patents that are citationally related (that is, they cite to or are cited by one or more common or citationally related patents) will tend to gravitate together and form clusters. Patents that are not citationally related will tend to disperse.

For example, the SOM map 300 shown in FIG. 6 was generated using an iterative mapping algorithm and relational citation analysis as described herein-above to optimize a scaled distance between a plurality of citationally related patents identified in the aerospace technology space. After several hundred iterations, the particular illustrated pattern of dots evolves from an initial random milieu of dots contained within an arbitrary 2-dimensional space. Certain clusters of dots 350*a-e* are formed, as illustrated, corresponding to clusters of citationally related patents and/or other related documents.

In another particularly preferred embodiment, the mapping algorithm seeks to minimize the square of a calculated error signal (actual distance less desired distance) between one or more pairs and/or groups of citationally related patents (or other documents) in a space, wherein the desired distance is calculated as a selected transform function of the relevance score calculated as described above. More preferably, the desired scaled distance is calculated from determined relevance scores according to a log-inverse probability function. Advantageously, in accordance with one preferred embodiment of the invention the relative locations and interproximities of patents 310 and patent clusters 350*a-e* are optimally or close-to-optimally arranged within the space so that patents and/or other documents that are citationally related will tend to cluster together and non-citationally-related documents will tend to disperse. For example, patents comprising the dots in cluster 350*a* mostly relate to avionics controls. The patents comprising cluster 350*b* mostly relate to in-flight guidance systems. The patents comprising cluster 350*c* mostly relate to earth-orbiting satellite technology. The patents comprising cluster 350*d* mostly relate to airplane wing deicing technology. The patents comprising cluster 350*e* mostly relate to aircraft wing design and aerodynamic flow surfaces.

The particular size, shape and localized dispersement characteristics of the SOM map 300 and clusters 350*a-e* can be modified or controlled by adjusting one or more specifying parameters of the transform function that is preferably used to convert relevance scores to desired patent separation distances. Preferably, a log-inverse probability transform function is used having log-mean and log-standard-deviation as specifying parameters. More preferably, the specifying parameters are adjusted and optimized so as to minimize the average or total error signal between the map-represented distances and the calculated desired distances between citationally related documents. More preferably, the actual represented distance or scaled distance between any two patents represented on the SOM map 300 is correlated to and/or approximately equal to or representative of an arbitrary scaled distance ("citation distance") calculated as the log-inverse probability function of the calculated relevance score. Most preferably, the citation distance is scaled so that patents having a citational relationship at the first generation will, on average, have a scaled citation distance equal to an actual or arbitrary scaled measurement unit of 1.

Those skilled in the art will readily appreciate that an SOM relevance mapping algorithm substantially as disclosed and described above can be used to visually represent, differentiate, cluster and categorize a plurality of related patents or other documents of interest within a given technology space based on relational citation analysis, contextual similarity analysis, and/or calculated relevance scores and wherein a scaled distance between any two selected patents represented on the SOM map 300 is generally proportional to or representative of a determined degree of relevance or similarity between the selected patents. Advantageously, the relevance mapping algorithm in accordance with one preferred embodiment described herein is able to generate visual outputs that are statistically accurate and repeatable. The results also are not influenced by subjective judgments as to how to best fit various related and unrelated technologies into a uniform technology classification schema or by various semantic differences in how technologies may be described in a patent document.

Figure 7:
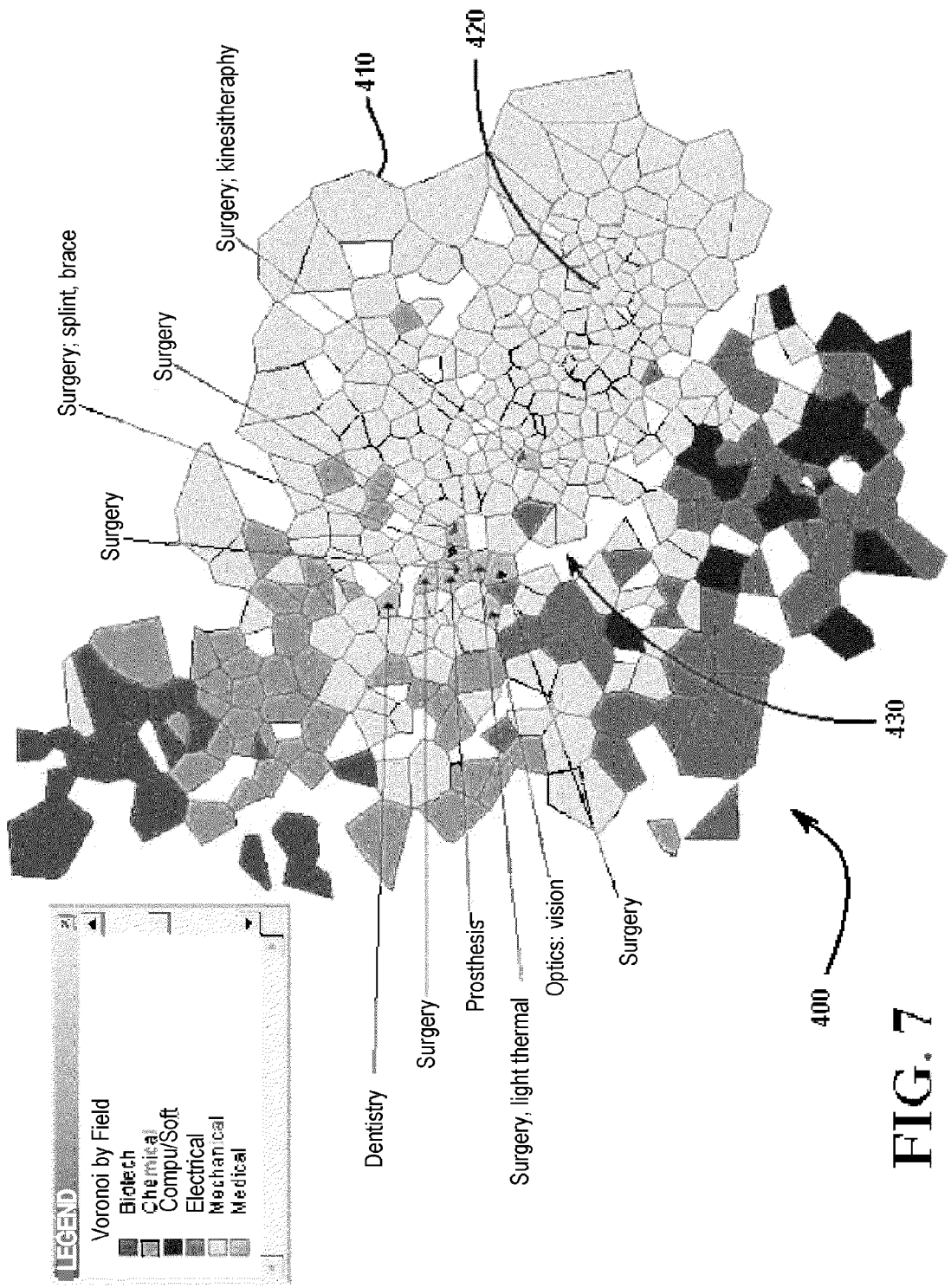
FIG. 7 is a 2-dimensional SOM map of the entire U.S. patent space (all patents issued from 1983 to 2003) generated in accordance with one embodiment of the present invention, and wherein major groups of patents are divided into logical cells or domains.

If desired, one or more high-speed computers could be employed on a continual basis to calculate relevance scores and apply SOM relevance mapping across substantially an entire database of patents and/or other related documents of interest. For example, FIG. 7 shows a 2-dimensional SOM map 400 of the entire U.S. patent space (all patents issued from 1983 to 2003) generated in accordance with one embodiment of the present invention. In this case major groups of patents are divided into logical cells or domains 410, 420 by class and/or using Voronoi analysis. Preferably, peak densities of plotted clusters are identified and a structured Voronoi cell map overlay is developed using the determined peak density locations as center points or anchors for each logical domain or cell. If desired, individual cells may be color-coded or pattern-coded, as shown, to indicate a general field of technology (e.g., mechanical or biotechnology, etc.). Cells can be further characterized or defined according to any one or more factors that may be of interest, including without limitation, traditional patent classifications, key word frequency, latent semantic analysis, claim terminology, growth rates, litigation rates, average IPQ, average pendency, patent densities, patent attrition and/or maintenance rates, obsolescence rates, and the like. In the particular indicated example, individual patent domains or cells are identified according to the most popular primary USPTO classification of patents within each domain.

Figure 8:
FIG. 8 shows the 2-dimensional SOM map of FIG. 7 modified to illustrate average IPQ scores of each identified major group of patents.

FIG. 8 shows the 2-dimensional SOM map 400 of FIG. 7 modified in accordance with another embodiment of the invention. In this case the major groups are color coded by average IPQ score (red being highest, dark green being lowest). The map shows at a glance which specific technology areas are least active and most active and which are producing the highest likely patent values. The map also advantageously reveals "white space" opportunities 430 between cells of localized patent concentrations where new patent value-creation opportunities may likely exist.

Figure 9:
FIG. 9 shows the 2-dimensional SOM map of FIG. 7 modified to illustrate average historical litigation rates of each identified major group of patents.

FIG. 9 shows the 2-dimensional SOM map 400 of FIG. 7 modified in accordance with another alternative embodiment of the invention. In this case the major groups are color coded by average historical litigation rates (red being highest, dark green being lowest). The map shows at a glance which specific technology areas are least litigation-active and which are the most litigation-active. The map can thus be used to develop, analyze and communicate litigation risk profiles for any particular patent or technology area of interest. For example, this map may be useful for analyzing one or more insurable events (e.g., infringement, invalidity, etc.) and determining appropriate cash reserve levels and/or insurance risk premiums.

Most preferably, the resulting SOM map data generated in accordance with the present invention is used in conjunction with any one of a number of commercially available mapping software tools (e.g., Map Info™) to provide a novel, highly intuitive and convenient input/output display and communication interface for visualizing and analyzing multiple documents and/or groups of documents relevant to a desired target space. For example, the Map Info™ product enables a user to pan and zoom within a mapped document space to explore various clusters and interrelationships of patents or other documents in and around possible areas of interest. Users can also "drill down" into the mapped data and selectively reveal or highlight specific selected information that may be of interest.

Figure 10A:
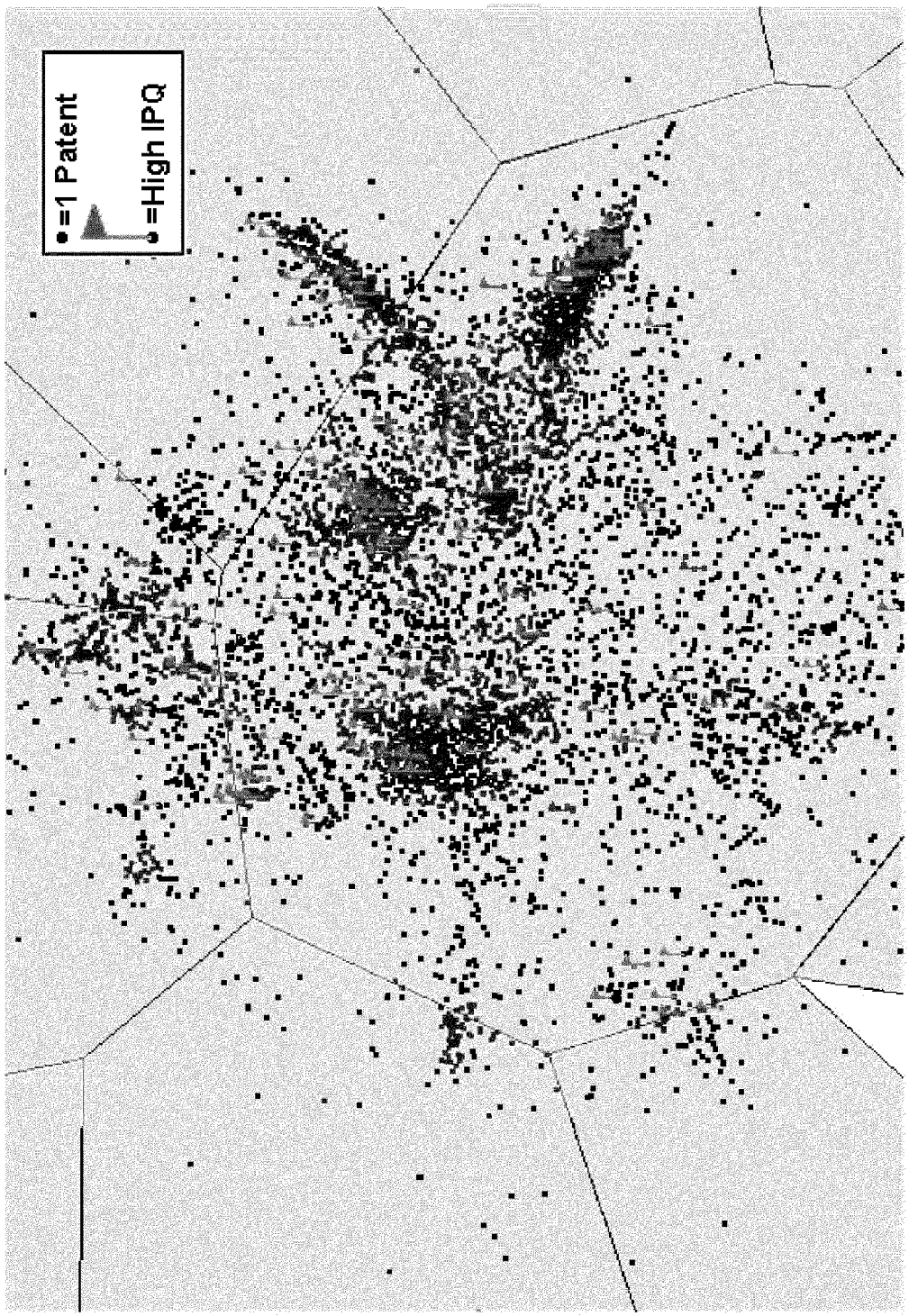
FIG. 10A shows a drill-down view of the aerospace technology space wherein all high-IPQ patents (patents having IPQ scores above a selected threshold) have been flagged or highlighted.
Figure 10B:
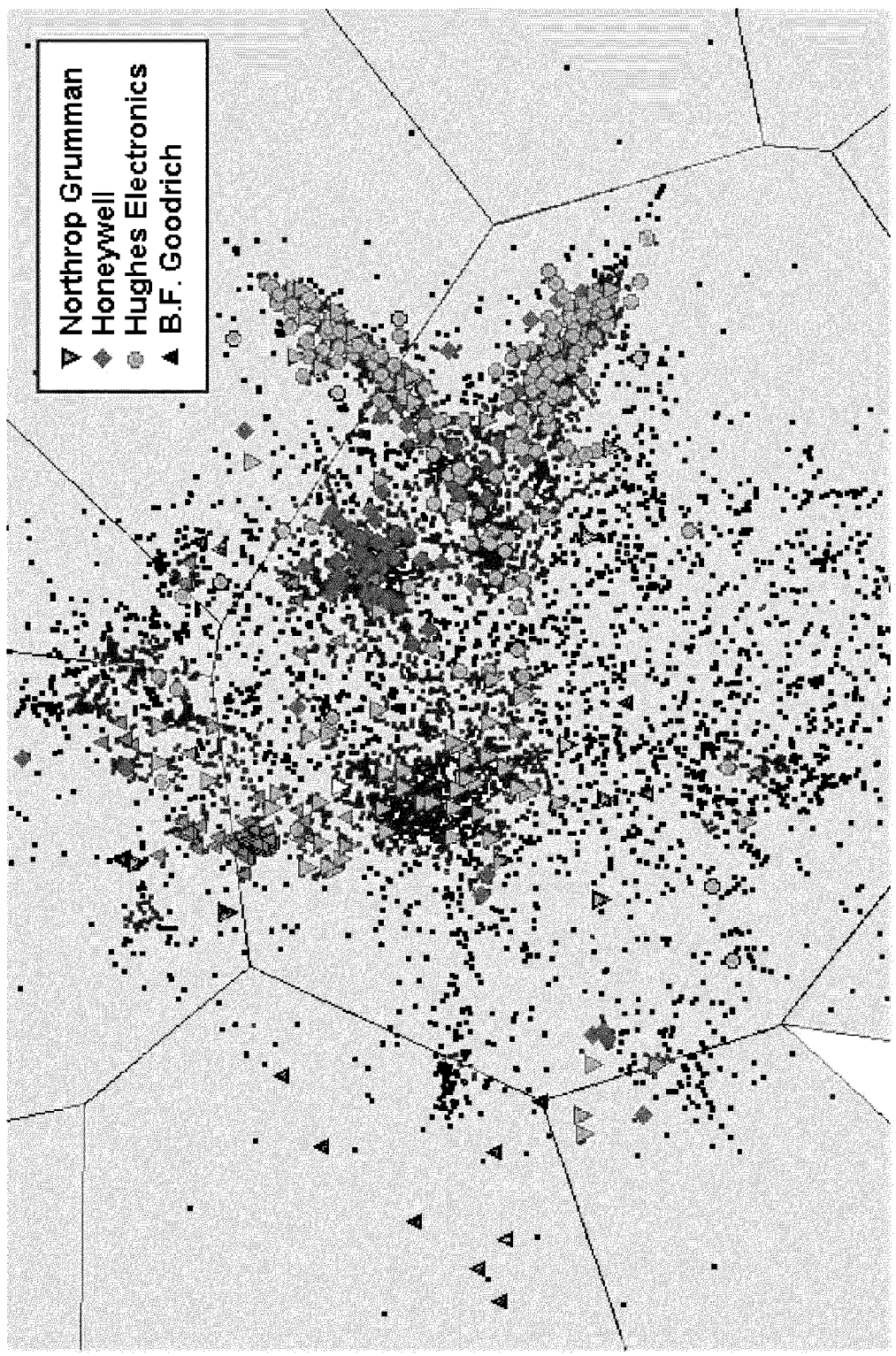
FIG. 10B shows a drill-down view of the aerospace technology space of FIG. 10A wherein patents owned by selected competitors have been highlighted and color/shape coded.

For example FIG. 10A shows a drill-down view of the aerospace technology space defined generally by voronoi cell 420. In this case high-IPQ patents (patents having IPQ scores above a selected threshold) have been flagged or highlighted. This may be very useful information for purposes of better understanding a space and/or for target identification/analysis (e.g., finding patents in a relevant space to buy, sell, license or assert). FIG. 10B shows an alternative drill-down view of the aerospace technology space 420. In this case patents owned by selected competitors have been highlighted and color/shape coded. This drill-down view may be particularly useful for purposes of strategic planning, strategic acquisition analysis, and industry economic/financial analysis. Highlighting patents owned by selected competitors facilitates better and more strategic understanding the competitive landscape in a target technology space. It can also quickly and visually communicate which competitors own or dominate certain concentrations of patents and the how the various concentrations or clusters interrelate.

EXAMPLES

The following examples illustrate several unique applications of the invention disclosed herein, highlighting some of the particular advantages and benefits contemplated. Of course, the invention is not limited to any particular example or embodiment disclosed.

Example #1

Improved Patent Rating/Ranking

FIG. 11 is a generalized overview diagram of a modified multivariate regression model for rating and/or analyzing patents having features and advantages of the present invention. As discussed above in connection with FIGS. 1-3 the model preferably considers a variety of individual input data points drawn from various relevant data sources. The model further applies a statistically optimized transform or weighting function to calculate, based on the input data, the statistical probability that one or more patents selected from a particular population of patents will be maintained or abandoned in the future (or exhibit another characteristic or event of interest).

Preferably, the model considers as additional input regression variables the mapped location of a patent asset within the SOM map 300, its determined location within a particular technology space or cell 310 and/or its particular determined location relative to other patents and clusters of patents 250b within a technology space. More preferably, a peer group of relevant patents is first defined using the map 300 and/or underlying relevance data. Advantageously, the peer group may be used to provide a technology normalization reference point and may also be used to provide additional statistically informative input data to the rating regression model. Most preferably, informative input data (e.g., occurrence of abandonment/maintenance events and/or other statistically informative information) relative to one or more identified peer group patents is weighted according to relevance scores calculated with reference to a patent of interest to be rated or scored according to the model. In this manner a more statistically predictive and reliable ratings model is provided.

Example #2

Relevance Searching

SOM mapping, relevance analysis and/or ratings can advantageously be deployed to provide an improved search engine for locating patent documents and/or other related documents of interest. Preferably a first group of patents is identified representing the closest known references to a particular technology or search topic of interest. These patents may represent, for example, a list of cited patents identified in a previous patent search and/or they may be identified using traditional search tools, such as key word searching, structured search queries, hand searching or the like. Relevance analysis is preferably performed on each identified patent in the first group to generate a second group of additionally relevant patents, each having an associated relevance score relative to one or more patents identified in the first group.

Relevance scores for each identified patent in the second group are preferable summed and/or mathematically combined to provide a single relevance score for each patent in the second group relative to the entire group of patents identified in the first group. Most preferably, relevance scores are probabilistically combined in such a manner that the aggregated relevance scores represent the estimated event probability that the relevant patent in the second group is citationally related at the first generation to one or more patents in the first group. Search results are preferably ranked, sorted and displayed according to the aggregated relevance score. More preferably, the search results are displayed in the form of an interactive chart, graph or SOM map. Most preferably, a researcher can review and select additional relevant patents and/or other documents revealed in the second group and add them to the first group. The first group can then be refined/modified and the relevance analysis iteratively repeated as many times as desired to generate refined and/or more relevant search results.

Example #3

Target Identification and Qualification

In the field of mergers and acquisitions it is often desirable to be able to screen, test and qualify potential merger or acquisition targets against one or more strategic goals. For example, it is often a primary goal of a merger or acquisition to increase shareholder value by combining one or more similar assets to create synergies and economies of scale. In the various high-tech industries a major part of the overall contemplated value proposition supporting a merger opportunity may lie in the aggregation of complimentary patent assets and related technology assets (e.g., trade secrets, software, know-how, and human R&D capital). Primary value drivers include: (i) elimination and/or reduction of patent infringement risk (including all of the concomitant expenses associated with risk identification, assessment and mitigation); (ii) enabling creation of improved product lines and services that utilize the best patented features from both portfolios; and (iii) combining complimentary R&D resources and associated human capital to increase and improve overall innovation output.

One particularly unique and desirable aspect of the present invention is that it facilitates statistical measurement and quantification of the degree to which one or more patent portfolios (and the underlying associated R&D resources and human capital) may compliment each other. For example, relevance analysis and/or relevance scores can be generated for each patent owned by a potential acquisition target relative a potential acquiring company. Higher average relevance scores would indicate the presence of more complimentary patents, while lower relevance scores would indicate the presence of less complimentary patents. Relevance scores could also be generated relative to one or more identified competitors to determine and measure how a particular acquisition target might look strategically to other major players in a technology space. Relevance scores could also be combined with IPQ scores, financial metrics and/or other associated information to provide any number of informative measures, ratios, benchmarks and the like to help guide merger and acquisition decision analysis.

Those skilled in the art will recognize that similar identification and qualification techniques can be used to identify and qualify specific patent assets and/or groups of patent assets desired to be purchased or sold through private negotiated transactions, public sales and/or private or public auctions and the like. For example, relevance analysis could be used to determine the identity of the most likely buyers, purchasers or bidders of one or more specific patent assets desired to be sold. Alternatively, relevance analysis could be used to determine the identity of the most likely sellers of one or more technology-specific patent assets desired to be purchased. For example, relevance analysis could be used to help determine whether a particular patent asset is "core" or "non-core" relative to the prospective seller's overall patent and product portfolio. Similar regression analysis techniques could also be used to predict and identify specific patent assets that are likely to be abandoned by a current patent owner in the near future.

Example #4

Resource Optimization

Statistical and anecdotal evidence supports the notion that patent law firms, attorneys and agents having particular expertise in a technology area produce higher quality work product than comparable firms having only general expertise. Firms, attorneys or agents having particular expertise in a technology area are typically more adept and efficient at writing, analyzing, and prosecuting patent applications in the technology area. Presumably, this is because they possess greater depth of knowledge in the technology area, are more intimately familiar with the relevant prior art and/or have more experience drafting and prosecuting relevant patents in the space.

It is not always easy to identify, qualify and rank patent attorneys, agents and/or firms possessing desired technical expertise. Relevance analysis, SOM mapping, and/or ratings can be deployed to quickly identify and qualify one or more legal resources (e.g., law firms, attorneys and/or agents) based on particular identified technology expertise and/or work product quality. A technology of interest is first defined and/or one or more patents are identified as a result thereof. A relevance analysis is performed based on either a key word search or a selected group of patent(s) and a list of relevant patents is preferably generated along with associated relevance scores and IPQ scores. Most preferably, although not necessary, relevance and IPQ scores are multiplied together for each patent so that IPQ scores are essentially weighted by relevance to the technology of interest. Totals are then generated for each firm-attorney-agent identified by the relevant patents and the results are ranked from highest to lowest. Firms-attorneys-agents having the most relevant, highest quality (high-IPQ) patents are ranked highest. Firms-attorneys-agents having the least relevant, lowest quality (low-IPQ) patents are ranked lowest.

SOM mapping, relevance and/or ratings can be similarly deployed by a patent law firm, attorney or agent to quickly identify and qualify one or more potential clients based on particular technology expertise and/or work product quality. For example, a particular technology of interest is defined according to expertise possessed by the firm, attorney or agent. A relevance analysis is performed based on either a key word search or a selected input group of patent(s). A list of relevant patents is preferably generated along with associated relevance scores and IPQ scores. If desired, relevance and IPQ scores may be multiplied together for each patent so that IPQ scores are essentially weighted by relevance to the technology of interest. Totals are then generated for each potential client identified by the relevant patents and the results are preferably ranked from highest relevance to lowest relevance. Potential clients having the most relevant, lowest quality (low-IPQ) patents are ranked highest. Potential clients having the least relevant, highest quality (high-IPQ) patents are ranked lowest.

As another example, SOM mapping, relevance and/or ratings can be deployed by a company, university or other patent portfolio holder to quickly identify and qualify one or more potential inventors or researchers based on particular technology expertise and/or a track record of patent quality/value. A technology of interest is defined according to a particular technology expertise possessed or desired to be possessed by the company. A relevance analysis is performed based on either a key word search and/or a selected input group of representative patent(s). A list of relevant patents is preferably generated along with associated relevance scores and IPQ scores. If desired, relevance and IPQ scores may be multiplied together for each patent so that IPQ scores are essentially weighted by relevance to the technology of interest. Totals are then generated for each potential inventor/researcher identified by the relevant patents and the results are ranked from highest relevance to lowest relevance. Potential inventors/researchers having the most relevant, highest quality (high-IPQ) patents are ranked highest. Potential inventors/researchers having the least relevant, lowest quality (high-IPQ) patents are ranked lowest. The results may be used for purposes of optimally staffing ongoing research projects, defining collaboration agreements, research staff reviews and performance benchmarking, recruiting and job placement, strategic headhunting, and other similar applications. Similar processes and procedures may be used to identify and optimize allocation of patent office resources.

Example #5

Semantic Analysis

SOM mapping, relevance and/or ratings can advantageously be deployed to provide improved semantic analysis. Preferably one or more clusters of patents and/or other related documents are identified using relational citation analysis, relevance analysis and/or SOM relevance mapping. Logical clusters are then further analyzed for word frequency usage. Similarities and/or differences are identified and analyzed using latent semantic filtering and/or other similar techniques. For example, various descriptive words and word combinations can be identified for aptly describing each patent cluster using probabilistic latent semantic analysis (PLSA). Logical subject matter indexes can then be constructed based on semantic analysis of multiple logical clusters and subclusters of patents. Advantageously, relevance analysis and the other novel techniques deployed in accordance with the present invention ensure relevance and contextual similarity of clustered documents.

As another example, relevance analysis can be used to generate dictionaries of similar and/or synonymous words. Preferably, descriptive key words appearing in patent titles of clustered patents are statistically analyzed and mapped to similar or related words appearing in the title, abstract, description or claims of the clustered patents. For example, the word "engine" may be statistically correlated to the words "cylinder", "piston" or "internal-combustion". Such an index of statistically correlated words can be used to provide improved keyword searching and/or further analysis.

Example #6

Data Cleansing/Unification

Those skilled in the art will readily appreciate that virtually any large information database will typically and invariably contain some imperfect data entries. These may generally include, but are not limited to, misspellings, spelling variations, missing or incomplete data, data format variations, name variations, name changes, variations in the use or non-use of ASCII extended characters, and the like. In the context of conducting database searching and aggregated data analysis, these imperfect data entries are exceedingly problematic and annoying. For example, if one wished to identify all patents issued to IBM in 2004 one would need to search under at least 23 different name variations, including:

IBM Corporation
Intenational Business Machines Corporation
Internatioal Business Machines Corporation
Internation Business Machines Corporation
International Busines Machines Corporation
International Business Machine Coroporation
International Business Machines Company
International Business Machines Corporation
International Business Machines Corp.
International Business Machines Corporaiton
International Business Machines Corporatiion
International Business Machines Corporatioin
International Business Machines Corporation
International Business Machines Corporations
International Business Machines Corporatoin
International Business Machines,
International Business Machines, Corp.
International Business Machines, Corporation
International Business Machines, Inc.
International Business Machines Corporation
International Businesss Machines Corporation
Internationl Business Machines Corporation
International Business Machines Corporation This list does not even include the hundreds of subsidiaries owned or controlled by IBM, each with its own unique set of name variations. It also does not include a large percentage of published applications owned by IBM or its subsidiaries for which assignee name information has not yet been recorded or published (assignee name is completely missing from the published application).

Conceivably, a person desiring to conduct a database search for IBM owned patents could construct a complex query or set of queries run in succession that would attempt to capture some or all of the identified name variations. But this requires tedious and time-consuming work and there is no significant confidence that all relevant documents would be identified. It would be more convenient and provide a searchable data resource that corrects and/or "unifies" all the possible name variations in each case. This task can be accomplished or at least substantially advanced using multivariate regression analysis in accordance with one preferred embodiment of the invention.

Preferably, an assignment database is constructed containing current and historical patent assignment information and other relevant associated information. Proposed matches are preferably generated from a list of unique assignee names by identifying statistically informative similarities, such as common characters, syllables, words, and the like ("string similarities") and/or common inventors, common attorneys/firms, common geography, and the like ("substantive similarities"), associated with each unique assignee name. A statistically relevant sample of proposed matches is selected and a match verification indicator ("yes" or "no") is generated for each proposed match. A multi-variate probit regression algorithm is then constructed and optimized to statistically predict whether two or more selected assignee names "match" (are variations of) a single assignee name. For example, the regression algorithm could advantageously be constructed and optimized from the selected statistically relevant sample using the match verification indicator as the dependent variable and using the various identified statistically informative similarities as the independent variables. Independent regression variables preferably include, without limitation: number or percent of matching characters, character pairs, syllables, and/or other various string similarity functions such as Levenstein distance and the like. Independent regression variables preferably also include, without limitation, a variety of substantive similarities, such as: number or percent of matching inventors, matching inventor city and state combinations, matching assignee city and state combinations, matching assignee street address, matching attorney/firm names, matching subject matter classification codes, matching patent family members, citation overlap, associated relevance scores, and the like.

Advantageously, multivariate regression analysis and the other novel techniques deployed in accordance with the present invention ensure a desired level of statistical accuracy, repeatability and efficiency in the ongoing task of matching assignee name variations. It also advantageously enables accurate statistical assessment of probable ownership in cases where the assignee name is not otherwise identified (e.g., applications published prior to the filing of assignment documents) by identifying and assessing other statistically informative associations such as various identified substantive similarities. Similar techniques may also advantageously be employed to correct and/or unify attorney/firm names, inventor names, city/state and other geographic information, address information, examiner names, subject matter descriptions or classification codes, and the like. Similar techniques may also advantageously be employed in more general (e.g., non-patent) contexts to correct and/or unify business names, personal names, authorship information, address information, document titles, subject matter descriptions, relationships/contacts data, data scrubbing and/or other similar applications.

Example #7

Product-to-Patent Mapping

In another preferred embodiment SOM mapping, relevance and/or ratings can be deployed to quickly and automatically identify and map commercial products or services that correlate (or likely correlate) to one or more patents. This may be convenient, for example, to enable users to retrieve patent numbers by inputting one or more commercial product names or specifications. Patent commercialization data (e.g., the presence or absence of a commercial product covered by a patent and/or other relevant data, such as sales volume, sales growth, profits, etc.) could also provide additional objective metrics by which to rate relevant patents in accordance with the invention. For example, patent survival statistics indicate that patents that are being actively commercialized are statistically more valuable than so-called "paper patents" for which there is no known corresponding commercial product.

As disclosed in U.S. Pat. No. 6,556,992 issued to Applicant, and incorporated herein by reference in its totality, product patent marking data and related information can advantageously be collected and stored on a centralized, searchable computer network database or the like in order to allow users to search and obtain patent information on particular commercial products. Relevant patent marking data could be gathered either through private voluntary reporting by manufacturers of such products and/or it may be gathered through other available means, such as automated web crawlers, third-party reporting or inputting and the like. Preferably, the patent marking database can also include the necessary URL address information and/or the like which will allow users to hot-link directly to a third-party web page for each corresponding product and/or associated product manufacturer.

Advantageously, SOM mapping, relevance and/or ratings can be deployed to quickly and automatically identify and map commercial products to one or more correlating patents. For example, a database of know product-patent correlations (e.g., from patent marking information) can be provided and analyzed. Relevance analysis, latent semantic analysis, SOM mapping and/or a combination thereof, can be used to group subject-matter-related patents into relevant clusters. Similar analysis can be performed on product documentation describing various features and advantages of each patented product. The resulting patents and patent clusters and the products and product clusters can then be mapped to one another or superimposed using the known product-patent correlations. A regression analysis can then be performed to identify statistically relevant semantic correlations between clustered products and clustered patents. For example, specific product features and/or descriptive terminologies may be statistically mapped or correlated to specific claim limitations and/or specific claim terminologies. This information, in turn, can be used to help identify unknown product-patent correlations.

Preferably, products having unknown patent correlations are analyzed using semantics and/or relevance analysis (e.g., examining various relevance links between two or more products) to determine or estimate a degree of relevance to one or more patents and/or other products for which product-patent correlations may be known. Preferably, a multivariate probit regression model is formulated and optimized to determine or estimate the probability that a particular product would be covered by or correlated to one or more identified patents. Independent regression variables may include, for example and without limitation: semantic similarity of product description to patent description or claims; semantic similarity of product description to other related product descriptions for which a product-patent correlation may be known; identity or similarity of channels of distribution; identity or similarity of purchasers or users; identity or similarity of SIC codes; identity or similarity of trademark goods & services descriptions; location or relative proximity of two or more related products on a regression-optimized SOM product map; and/or location of one or more products on a regression-optimized SOM product map relative to the location of one or more patents on a superimposed regression-optimized SOM patent map.

Example #8

Claim Breadth Analysis

The scope of legal protection afforded by a patent is uniquely and specifically defined by the "claims" of the patent. The claims provide a concise legal definition of what was approved to be patented by the United States Patent & Trademark Office ("USPTO") and sets forth the metes and bounds of the patentee's right to exclude others from making and using the patented invention. The mere fact a patent has been duly authorized and issued by the U.S. or other national Patent Office does not guarantee it will have any value. Each patent is unique in the scope and extent of what it covers. There are broad patents and narrow patents; valuable patents and worthless patents. Two patents in the same industry and relating to the same general subject matter can command dramatically different transaction values and royalty rates in a free market (or damage awards in litigation) depending upon subtle differences in claim language that can affect the comparative breadth of each patent.

The value of a patent is directly impacted by the scope and breadth of the patent claims. Because the claims precisely define the right to exclude, it is axiomatic that a patent will have value only for and to the extent that the claims actually exclude or cover a product, method or other manufacturing output having some economic value. There can be no value in the right to exclude others from doing something they either: (i) have no desire to do in the first place; or (ii) do not need to do because of the availability of non-infringing alternatives. As a result, claim breath must be carefully analyzed and assessed as an integral part of any patent analysis. All other things being equal, patents having broad claims (few limitations) will be more valuable than patents having narrow claims (many limitations). Narrow claims confer narrow rights affecting only a relatively small portion of relevant economic output. Broad claims confer broad rights affecting a relatively large portion of relevant economic output.

SOM mapping, relevance and/or ratings can advantageously be deployed to provide improved claim breadth analysis. Preferably one or more clusters of patents and/or other related documents are identified using relational citation analysis, relevance analysis and/or SOM relevance mapping. Logical clusters are then further analyzed to construct a statistical hierchy of claims and/or claim language according to relative breadth. For example, dependent claims are necessarily narrower than independent claims. Thus, relationally associated words and phrases used in the dependent claims and independent claims can be placed in a word breadth hierchy according to a statistically optimized regression analysis. The regression analysis is preferably formulated and optimized to predict whether an analyzed claim (using particular language and/or structure) is broader or narrower than one or more other claims based on various input regression variables.

As another example, an alternative and/or enhanced claim breadth regression model is formulated and optimized using multi-variate regression analysis. For example, it is well known that later filed patents cannot legally claim coverage of subject matter disclosed in earlier filed/published patents. Thus, a later filed patent is necessarily narrower in scope than a relevant earlier filed or issued patent. Using relative breadth as the dependent regression variable one can construct and optimize a regression algorithm that would be predictive of relative claim breadth. Independent predictor variables could include, for example and without limitation: claim word count, unique word count, particular word and word combination frequencies, limiting or restricting words, broadening or inclusive words, semantic similarity scores between two or more claims, number of relevant documents and associated relevance scores, and the like. Those skilled in the art will recognize that the regression analysis can be formulated and optimized to predict whether an analyzed claim is likely broader or narrower than one or more comparison or reference claims.

As another particularly preferred example, an alternative and/or enhanced claim breadth regression model is formulated and optimized using semantic claim coverage analysis. Claims can be modeled, for example, as a structured search query comprising one or more words, phrases, or concepts embodied by the particular language and/or structure of the claim. Claim scope or breadth can be mathematically modeled or estimated in this context as the number of documents within a database of relevant documents that would satisfy each structured query. Short claims containing only a few common words, phrases or concepts would have the largest breadth because more documents are likely to satisfy a structured query based on the claim. On the other hand, long claims containing a variety of uncommon words, phrases or concepts would have the narrowest breadth because less documents are likely to satisfy a structured query based on the claim.

The relative breadth of patents and/or whole patent families containing multiple independent claims could similarly be mathematically modeled as the total number of unique documents within a database of relevant documents that would satisfy any one of a number of structured search queries based on each claim in the patent or patent family. In this manner, overlapping claim coverage (structured claim queries that turn up some or all of the same search results) is advantageously taken into account in defining or estimating an overall scope of a patent, patent family or patent portfolio. In other words, under this approach one hundred patent claims covering the same subject matter as a single claim would be considered essentially equal in scope. If desired, the occurrence and/or extent of overlapping claim coverage could also be measured and reported as an alternative measure of claim breadth, claim intensity, likely validity, and/or some other similar metric of interest.

The structured search query in each case could be a simple conjunctive key-word search or something more sophisticated. For example, structured queries could be semantically expanded or enriched using latent semantic analysis and/or by drawing statistical and/or contextual relationships from the specification, other claims or other relevant identified patents. Preferably, a full-text database of relevant patent documents is defined for purposes of executing structured search queries representing each claim. This database may include later-filed patents, earlier-filed patents, or both, as desired. Alternative and/or additional databases may include, without limitation, published scientific journals or periodicals, patent abstracts or claims, various on-line databases, and/or the world-wide-web or any portion thereof. More preferably a database of patents and related documents is defined using relevance analysis in accordance with one or more preferred embodiments of the present invention. Most preferably, relevance scores are further used to weight the results of each structured search so that highly relevant documents are accorded greater weight in determining an estimated claim scope than less relevant documents.

Those skilled in the art will recognize that a multi-variate regression analysis can be formulated and optimized around any one or more of the above-described examples to optimally and objectively predict or estimate the scope or breadth of coverage embodied by one or more patent claims. Those skilled in the art will further recognize that one or more similar techniques could be developed to statistically estimate the likely validity of one or more patent claims based on a combination of claim breadth analysis and relevance analysis as disclosed and described herein.

Example #9

Royalty Modeling

In many transactions involving patent sales, licensing, cross-licensing, patent pooling, patent litigation/arbitration/mediation, appraisal/valuation, and the like, it may be helpful or useful to provide an objective benchmark or guideline for calculating a reasonable royalty payment to be made to one or more patent owners, licensors or inventors. SOM mapping, relevance and/or ratings can advantageously be deployed to provide improved royalty benchmarking and other objective guidelines for purposes of royalty calculation. For example, reasonable royalty rates are typically determined by conducting a comparative survey of similar or representative patents for which royalty rate data is available. Typically the closest representative example is used provide a reasonable royalty guideline. Alternatively, a simple mathematical average may be taken across all identified representative examples to provide a "blended" guideline rate.

In accordance with one preferred embodiment of the invention, relevance analysis and/or SOM relevance mapping is used to identify and quantify one or more representative patents for which royalty rate data is or may be available. More preferably, identified representative royalty rate examples are weighted and averaged in accordance with a determined relevance score relative to the patent of interest. Most preferably, identified representative royalty rate examples are weighted and averaged in linear proportion to the determined relevance score relative to the patent of interest.

As another example, a regression-optimized royalty sharing formula may be constructed based on relevance analysis and/or a combination of relevance analysis, claim breadth analysis and/or claim validity analysis. In a pooling or cross-licensing context, for example, it may be desirable to share or divide royalties paid by a licensee in accordance with a regression optimized formula that calculates a relative probability of patent coverage based on a combination of relevance analysis, claim breadth analysis and/or other factors. For example, two competitors may enter into a cross license agreement whereby each competitor is provided with a non-exclusive license under the other's patent portfolio. Typically, the exchange of licensed rights may not be identically balanced. For example, one competitor may have more extensive patent coverage than the other in a relevant technology space; and/or one competitor may have patents covering higher-value products and/or products produced at higher profit margins than the other. In that case typically a balance of payment(s) is negotiated and agreed as an off-set to counterbalance the relative difference in the value of the licensed rights.

In accordance with one possible implementation of the invention, a suggested guideline balancing payment can be objectively determined or estimated using a regression-optimized formula that essentially calculates a relative probability of patent coverage based on a combination of factors, including without limitation, relevance analysis, claim breadth analysis and/or claim intensity or validity analysis. For example, a cross-product calculation could be carried out across two or more patent portfolios whereby a claim coverage probability for each patent in a given portfolio is developed and statistically evaluated against every relevant patent in an identified competitive portfolio(s). The determined probabilities are then compared and/or mathematically differentiated so as to objectively suggest a level of imbalance and/or an appropriate or reasonable offsetting payment. The particular parameters defining the cross-portfolio imbalance formula or balancing payments formula can be principally negotiated and agreed in advance based on determined relevance, claim breadth, claim intensity, and/or other agreed factors. Alternatively, formula parameters may be determined objectively through regression-optimized analysis of historical licensing data, balance of payment data, patent maintenance data, litigation data and/or the like.

In patent pooling arrangements it may be similarly desirable to share or divide royalties paid by a licensor in accordance with a regression optimized formula that calculates a relative probability of patent coverage based on a combination of relevance analysis, claim breadth analysis and/or claim intensity/validity analysis. For example, a collection of related and/or determined relevant patents or associated patent interests may be aggregated into a single pool for purposes of achieving technological synergies, collaborative technology development and/or convenient centralized licensing of pooled patents or patent interests.

For purposes of economic fairness and in order to attract willing pool participants it is desirable to distribute each item of royalty income generated in some fair proportion to the estimated relative contribution of each patent in generating the royalty income. However, conducting a full-scale legal and economic fairness analysis in each case would be slow and cost prohibitive. It also undesirably encourages proliferation of disputes and contentiousness among pool participants as each participant jockeys for the legal and economic positions that best advance its own case and its own bottom line. Simply dividing royalties equally among pool participants and/or dividing in equal proportion to the number of patents contributed desirably avoids much of the legal wrangling, but it unfairly penalizes pool participants who have contributed the most valuable patent assets to the pool and unfairly rewards pool participants who have contributed the least valuable patent assets. The resulting economics are undesirably such to discourage pool participants from contributing their most highly-valued patents and to encourage proliferation and contribution of many less valuable patents.

In accordance with one possible implementation of the invention, a suggested guideline royalty allocation or royalty payment is objectively determined or estimated using a regression-optimized formula. In a closed patent pool, for example, pooled patents or patent interests are licensed only to pool participants who have contributed one or more patents to the pool. Assuming that pool participants acquire and maintain patents roughly in proportion to their respective product offerings and/or sales/profit revenues (a fair assumption, on average) then each patent can effectively be treated as defining or representing an associated quantity of licensed product. Each patent also then effectively provides a point of royalty distribution relative to all other patents in the pool. A cross-product calculation can be quickly carried out across the entire pool of contributed patent assets (and/or non-contributed patent assets) to determine or estimate reasonable royalty allocations and/or balancing payments for each pool participant vis a vis each other pool participant. Preferably, a claim coverage or claim overlap/domination probability for each patent in the pool is developed and statistically evaluated against every other patent in the pool. The determined probabilities are preferably compared and/or mathematically differentiated so as to objectively suggest appropriate or reasonable royalty payments and/or royalty allocations for each pool participant. Alternatively, those skilled in the art will recognize that simpler and/or more complex analyses can also be conducted and used as the basis for royalty allocation calculations, including without limitation, citation overlap, forward citation rates, semantic similarity analysis, and the like.

For example, pool participants may be charged a certain fee for each patent they contribute to and/or maintain in the pool. Preferably some or all of the participation fee is divided among pool participants (including, preferably, the contributing participant) according to the agreed royalty allocation formula. The resulting economics encourage pool participants to contribute only the best/strongest patents to the pool in order to reap maximum financial returns under the agreed royalty allocation formula. The resulting economics further discourages pool participants from proliferating and maintaining less valuable or valueless patents in the pool. Alternatively, pool participation fees and/or royalty allocations can be varied or adjusted, as desired, based on any one or more of a number of additional or alternative factors, including without limitation: size or estimated value of a contributed patent portfolio; IPQ scores, valuations and/or other rating/ranking scores for patents contributed or used; extent of revenues and/or profits generated by products in a technology space covered by one or more patents in the pool; legal infringement analysis based on one or more patents in the pool; forward citation analysis (single or multi-generational); risk analysis; geographic considerations; and the like.

In an open patent pool, pooled patents or patent interests may also be licensed to one or more third parties who have not (or not yet) contributed any patents to the pool. There are several preferred ways to allocate to pool participants royalty income generated from third parties. One way is to use relevance analysis, SOM relevance mapping and/or other tool(s) to define a centroid of the patent pool or relevant portion thereof. This is essentially the point within a relational space that minimizes the average relational distance or degree of separation between all other points in the space. In the patent pooling context it is typically the most active or most densely populated portion of the patent pool and contains typically the most heavily cited and litigated patent(s). Thus, in one example, third party royalty revenue is allocated to pool participants as calculated above based on a hypothetical point of distribution through the determined centroid. In another example, third-party royalty income may be associated with one or more licensed products. Based on an independent search and analysis, one or more patents (either within the pool or outside the pool) are identified as being most closely related and/or representative of the licensed product(s). If more than one relevant patent is identified these may be stack-ranked and/or weighted in accordance with a determined relative importance or degree of similarity. Royalty revenues are then be allocated to pool participants as calculated above based on a hypothetical point of distribution through one or more of the determined representative patent(s).

Other alternative approaches also are contemplated. For example, royalty revenues can be allocated across a pool of patents or patent interests in proportion to statistically estimated claim breath and/or a combination of estimated claim breadth and relevance. In another example, royalty revenues can be allocated across a pool of patents or patent interests according to relative forward citation frequency. For example, if a pool of patents receives 1000 forward cites in a given year and a participant's contributed patents receives 100 of these cites, then a fair or recommended royalty allocation would be 10%. In another example, royalty revenues can be allocated across a pool of patents or patent interests according to multiple forward citation frequencies tracked across several generations. For example, if a pool of patents receives 1000 first-generation forward cites, 2000 second-generation forward cites and 5000 third-generation forward cites, then royalties can be allocated as follows: 50% shared among the first-generation cite getters, 25% shared among the second-generation cite getters, 12.5% shared among the third-generation cite getters, and 12.5% shared among the fourth and higher generation cite getters. The exact proportions and sharing allocations can be varied or adjusted as desired to optimally allocate royalties in a manner that is perceptively most fair and that best encourages the highest level of patent pool participation.

Advantageously, the particular parameters defining a royalty allocation formula or balancing payment formula in any particular scenario can be negotiated and agreed in advance by pool participants based on determined relevance, claim breadth, claim intensity, and/or other factors. More preferably, formula parameters can also be determined and/or refined objectively through regression-optimized analysis of historical licensing data, balance of payment data, patent maintenance data, litigation data and/or the like. Suggested or estimated fair royalty allocations or balancing payments calculated in accordance with the present invention do not necessarily guarantee or result in complete fairness in all cases. But, they can advantageously provide an efficient and objective guideline or benchmark for helping determine a "more fair" or "fair enough" allocation in the context of various privately negotiated settlements, license agreements, pooling agreements, and the like.

Example #10

"ASCAP" Patent Pooling Model

The above royalty calculation methodologies and many other aspects and preferred implementations of the present invention have particularly advantageous application to the formation and operation of an open patent pool loosely modeled after the American Society of Composers, Authors and Publishers ("ASCAP"). In this case, a large number of related and/or unrelated patents or patent interests are preferably pooled together, clustered into logical groups or licensing bundles, and licensed openly under standardized terms to various industries who may use or wish to use some or all of the patented technologies. The benefits and advantages of forming and operating such a pool are demonstrably large and include, for example: realization of technological synergies on a vast scale; convenient centralized enforcement and licensing of pooled patent interests; centralized and more efficient asset management; reduction of business risks; reduction of patent litigation and other patent dispute resolution costs; decreased transaction costs; greater investment certainty; improved financial incentives for individual inventors, investors and small-businesses to innovate; increased velocity of innovation and development of new ideas and products; and increased fairness and predictability across all phases of patent procurement, licensing and enforcement.

Various possible working examples or embodiments of the ASCAP patent pooling model are contemplated. One simple preferred example is described herein for purposes of illustration. In this example preferably pool participants contribute to the pool a patent interest in the form of a non-exclusive license under one or more issued, in-force patents and/or pending applications. The license may cover the U.S. only, or it may include one or more additional licensed countries. More preferably, each contributed license is non-exclusive, worldwide in scope and has no restrictions. Most preferably, a standardized patent interest contribution agreement is used to efficiently facilitate each patent transaction and to precisely define the legal agreement between the parties, legal responsibilities and limitations, and, most preferably, the agreed parameters for calculating royalty allocations to be paid and distributed to each pool participant. Preferably there is a per-patent and/or per-transaction fee charged to pool participants up front to cover the initial transaction costs involved.

Using relevance analysis and/or SOM relevance mapping, pooled patent interests are preferably clustered into logical groups or "licensing bundles" preferably grouped or broken out by sector and/or industry. For example, SIC codes could be used to help identify relevant industry and/or sector groupings. The licensing bundles may or may not contain overlapping patents. For example, certain patents may have uses across multiple industries, in which case it may be desirable and efficient to include a single patent in multiple licensing bundles. For each licensing bundle a relevance analysis is preferably conducted periodically and used to determine a group of most-closely aligned or related patents that are not part of the licensing bundle or the broader patent pool. This is preferably an automated or semi-automated process.

Owners of the identified relevant non-pooled patents are preferably identified and offered the opportunity to take a license under the licensed bundle of patents (preferably under standardized, fair and simple terms) and/or to participate in the pool by contributing non-exclusive rights under the determined relevant patents and sharing in the resulting royalties that may be generated. For example, the terms of the non-exclusive license may simply provide for a flat percentage payment of gross revenues generated by products sold in various SIC codes and/or specific technologies covered by the licensed patents. Advantageously, if a patent owner chooses to participate in the pool, then royalties paid in could be partially or fully offset by allocated royalties paid out by the pool. Optionally, the pool could be combined with one or more specialized insurance products so that, for example, license fees paid into the pool would also buy an insurance policy ensuring against certain patent infringement risks in the technology space covered by the licensed bundle of patent rights.

Advantageously, providing patent pooling with an objective royalty allocation formula in accordance with one or more preferred embodiments of the invention disclosed and described herein increases the perceptive fairness and objectivity of royalty distributions to pool participants. This feature makes the pool a significantly more attractive and practical vehicle for patent aggregation and licensing than heretofore possible. Providing centralized licensing, monitoring and enforcement of pooled patent assets also provides tremendous benefit due to the consolidation of expertise and vast economies of scale. The formation and operation of one or more patent licensing pools along the lines described and discussed herein should also have significant pro-competitive effects, such as increasing access to technology, decreasing transaction inefficiencies and increasing the velocity of product innovation. As a result, it is not anticipated that such pools would be the subject of heightened antitrust review or the subject of opposition actions by the Federal Trade Commission or the European Trade Commission.

Example #11

Legal Conflict Checking

Legal and ethical rules require that law firms, lawyers and other legal professionals not engage in the representation of clients having adverse interests. For large law firms with many diverse clients, complying with the legal and ethical conflicts requirement can pose enormous administrative burdens. Moreover, the consequences for failing to comply and/or failing to take reasonable proactive measures to comply can be quite dire (attorney disqualification, disbarment, malpractice liability and/or other forms of financial liability). Especially for large firms practicing in the high-tech intellectual property space (e.g., patent prosecution and litigation) monitoring and resolving potential conflicts can be enormously challenging and time consuming.

The current state of the art in legal conflict monitoring and resolution typically involves circulating via e-mail lists of proposed new client engagements and new matter/case engagements for both new and existing clients to all legal professionals engaged in firm activities. Typically, each proposed new client/matter engagement includes a brief subject matter description of the proposed engagement along with an identification of the more salient potentially adverse parties. These conflict check lists are typically generated and required to be reviewed every morning/evening by each attorney or other legal professional practicing with a firm. For large firms with multiple hundreds or thousands of law professionals and multiple thousands of clients, the conflict check list can be quite voluminous and can result in expenditure of many hours of administrative and professional time each day to review and resolve.

There have been some attempts to automate or build greater efficiencies around certain portions of the conflict check process. For example, lists of adverse party names are now typically run through a client-name database in an attempt to automatically identify any name matches. However, this is an imperfect process because, as noted above, there are often a wide variety of possible name variations, aka's, dba's, subsidiaries, affiliates and/or other complex relationships. These variations and alternatives may not be adequately represented in a simple client name database. Subject matter conflict checking is another particularly challenging and time consuming aspect of the overall conflict monitoring and resolution process. One attempt to build greater efficiency includes the use of a computer database of patents itemized by owner, class, and subclass. Overlap of patent ownership across one or more classes and/or subclasses provides an indication of possible subject matter conflict. However, as noted above, patent classifications are notoriously prone to latent inaccuracies and inconsistencies in how the various classification categories are defined and applied by each of the national and international patent offices throughout the world. This makes the use of classification codes as possible conflict indicators less than reliable. Currently the only reliable way to monitor and resolve subject matter conflicts is through brute force reporting, reviewing and analyzing on an attorney-by-attorney and matter-by-matter basis. Due to the enormous time and resource constraints both in creating and reviewing adverse party and subject matter conflict checks, suffice it to say that the accuracy, efficiency and reliability of current conflict check systems are less than desired.

Advantageously, multivariate regression analysis and other novel concepts and techniques deployed in accordance with the present invention can be used to create and implement an automated conflict check system that is capable of statistically screening and monitoring potential adverse party and subject matter conflicts. In one preferred embodiment a unified name database is created using one or more of the regression analysis techniques as described above. The unified name database preferably includes subsidiaries, dba's and other name variations and related entities. Optionally, a broader conflicts database may include other related items of information, such as geographic location; IPC/SIC codes, assigned patents, trademarks, product names or descriptions, inventor names, executive names and/or the like. For each conflict check desired to be assessed, potential client names and/or adverse party names, including, optionally, one or more related items of information are provided as input regression variables to a multi-variate regression algorithm. The regression algorithm is preferably formulated and optimized to determine or estimate the risk probability of an adverse relationship or potential conflict based on the conflicts database and the provided input information. For example, the regression algorithm may be trained to identify and statistically assess certain string similarities and/or certain substantive similarities between a potential or existing client and one or more other clients or identified adverse parties.

As an alternative and/or enhanced example, relevance analysis can be used to measure or estimate the likelihood that one or more patents owned (or to be owned) by an existing or proposed new client would be cited against or cited by one or more patents owned by one or more existing clients. The citation of one client's patents against the patent(s) of another client presents a potential direct conflict of interest because the interest of one client would be to construe the cited patent broadly while the interests of the other client would be to construe the cited patent narrowly. Thus, the cumulative relevance score or citation probability between two portfolios provides a statistical measure of the likelihood of a subject matter conflict occurring. Similar conflict check algorithms and/or an improved or enhanced conflict check algorithm can be further developed using patent marking data, product-patent mapping data, trademark ownership data, copyright ownership data, product descriptions, SIC codes, historical litigation filings or disputes, oppositions, and the like. A particularly preferred technique is to formulate and optimize a conflict check algorithm using historical litigation or opposition data as a dependent regression variable and using various substantive conflict indicators (e.g., patent relevance scores, product overlap, sic code overlap, etc.) as independent predictor variables.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A computerized search engine for identifying and ranking relevant documents from a corpus of citationally-related documents, said computerized search engine comprising:
　　an input interface that enables a user to select a first set of identification information identifying one or more input documents from said corpus of citationally-related documents;
　　a computer-accessible index stored in a computer-readable storage device, said computer-accessible index comprising identification information identifying each potential input document from said corpus of citationally-related documents and, for each said potential input document, identification information identifying a selected number of citationally-related potential output documents from said corpus of citationally-related documents, said computer-accessible index further comprising for each pair of citationally-related potential input document and potential output document a first numerical score that is statistically correlated to the probability that a direct citation exists between each said pair of citationally related documents and wherein said first numerical score is calculated based at least in part on how many indirect citations exist between each said pair of citationally related documents and, for each indirect citation, how many citation links separate each said pair of citationally-related documents;

a computer processor configured to execute instructions stored in a computer-readable storage device, said instructions configured to cause said computer processor to:

access, from said computer-accessible index, a second set of identification information identifying one or more output documents corresponding to each of said one or more input documents and, for each identified pair of citationally-related input document and output document, said corresponding first numerical score; and calculate, for each identified output document, a second numerical score that is statistically correlated to the probability that a direct citation exists between any of said one or more input documents and each said identified output document, and wherein said second numerical score is calculated based at least in part on said first numerical score; and an output interface to display search results comprising identification information corresponding to said one or more output documents and wherein said search results are ranked in accordance with said second numerical score.

2. The computerized search engine of claim 1 wherein said computer-accessible index comprises, for each said potential input document, identification information identifying each citationally-related potential output document extending at least three generations and not more than five generations from each said potential input document.

3. The computerized search engine of claim 1 wherein said instructions are configured to cause said computer processor to calculate said second numerical score for each said identified output document by calculating the mathematical sum of said first numerical score for each corresponding identified pair of citationally-related input document and output document.

4. The computerized search engine of claim 1 wherein said instructions are configured to cause said computer processor to calculate said second numerical score for each said identified output document by calculating the statistical probability that each said identified output document is citationally related at the first generation to said one or more input documents.

5. The computerized search engine of claim 1 wherein said input interface and/or said output interface enable said user to select said first set of identification information at least in part from said search results.

6. The computerized search engine of claim 1 wherein said output interface visually displays said search results in the form of an interactive chart or graph.

7. The computerized search engine of claim 1 wherein said output interface visually displays said search results in the form of an interactive self-organizing map.

8. A computer system for enabling a user to execute one or more search queries to identify and rank relevant documents from a corpus of citationally-related documents, said computer system comprising:

an input interface that enables said user to select a first set of identification information identifying one or more input documents from said corpus of citationally-related documents;

a computer-accessible index stored in a computer-readable storage device, said computer-accessible index comprising identification information identifying each potential input document from said corpus of citationally-related documents and, for each said potential input document, identification information identifying a selected number of citationally-related potential output documents from said corpus of citationally-related documents, said computer-accessible index further comprising for each pair of citationally-related potential input document and potential output document a first numerical score configured to have a statistical correlation to whether a direct citation exists between said corresponding pair of citationally-related documents and wherein said first numerical score is calculated based at least in part on how many indirect citations exist between each said pair of citationally related documents and, for each indirect citation, how many citation links separate each said pair of citationally-related documents;

a computer processor configured to execute instructions stored in a computer-readable storage device, said instructions configured to cause said computer processor to:

use said first set of identification information to ascertain, from said computer-accessible index, a second set of identification information identifying, for each of said one or more input documents, a selected number of citationally-related output documents and, for each pair of citationally-related input document and output document, said first numerical score; and calculate, for each of said citationally-related output documents, a second numerical score configured to have a statistical correlation to whether a direct citation exists between any of said one or more input documents and each of said citationally-related output documents, and wherein said second numerical score is calculated based at least in part on said first numerical score; and an output interface to present search query results comprising a third set of identification information identifying one or more of said citationally-related output documents and wherein said search query results are sorted and displayed in accordance with said second numerical score.

9. The computer system of claim 8 wherein said computer-accessible index comprises, for each said potential input document, identification information identifying each citationally-related potential output document extending at least three generations and not more than five generations from each said potential input document.

10. The computer system of claim 8 wherein said instructions are configured to cause said computer processor to calculate said second numerical score for each of said citationally-related output documents by calculating the mathematical sum of said first numerical score for each corresponding pair of citationally-related input document and output document.

11. The computer system of claim 8 wherein said instructions are configured to cause said computer processor to calculate said second numerical score for each of said citationally-related output documents by calculating the statistical probability that each of said citationally-related output documents is citationally related at the first generation to said one or more input documents.

12. The computer system of claim 8 wherein said input interface and said output interface enable said user to select said first set of identification information at least in part from said search query results comprising said third set of identification information.

13. The computer system of claim 8 wherein said output interface presents said search query results in the form of an interactive chart or graph.

14. The computer system of claim 8 wherein said output presents said search query results in the form of an interactive self-organizing map.

15. A computer-implemented method for identifying and ranking relevant documents from a corpus of citationally-related documents, said computer-implemented method comprising:
    under control of a computing device configured with specific computer-executable instructions:
        receiving a first set of identification information identifying one or more input documents from said corpus of citationally-related documents;
        using said first set of identification information to ascertain, from a computer-accessible index: i) a second set of identification information identifying, for each of said one or more input documents, a selected number of citationally-related output documents, and ii) for each identified pair of citationally-related input document and output document, a first numerical score having a statistical correlation to whether a direct citation exists between each said identified pair of citationally-related documents,
            said computer-accessible index comprising: i) identification information identifying each potential input document from said corpus of citationally-related documents, ii) identification information identifying, for each said potential input document, a selected number of citationally-related potential output documents from said corpus of citationally-related documents, and iii) said first numerical score pre-calculated for each potential pair of citationally-related potential input document and potential output document and wherein said first numerical score is calculated based at least in part on how many indirect citations exist between each said potential pair of citationally related documents and, for each indirect citation, how many citation links separate each said potential pair of citationally-related documents;
        calculating, for each of said citationally-related output documents, a second numerical score configured to have a statistical correlation to whether a direct citation exists between any of said one or more input documents and each of said citationally-related output documents, and wherein said second numerical score is calculated based at least in part on said first numerical score; and
        displaying a search query result comprising a third set of identification information identifying one or more of said citationally-related output documents and wherein said search query results are sorted in accordance with each said corresponding second numerical score.

16. The computer-implemented method of claim 15 wherein said computer-accessible index comprises, for each said potential input document, identification information identifying each citationally-related potential output document extending at least three generations and no more than five generations from each said potential input document.

17. The computer-implemented method of claim 15 wherein calculating said second numerical score comprises calculating, for each output document, the mathematical sum of said first numerical score for each corresponding identified pair of citationally-related input document and output document.

18. The computer-implemented method of claim 15 wherein calculating said second numerical score comprises calculating, for each output document, the statistical probability that each said output document is citationally related at the first generation to at least one of said one or more input documents.

19. The computer-implemented method of claim 15 further comprising selecting said first set of identification information at least in part from said displayed search query results comprising said third set of identification information.

20. The computer-implemented method of claim 15 further comprising visually displaying said search query results in the form of an interactive chart, graph, or map.

* * * * *